US006072392A

United States Patent [19]

Henderson et al.

[11] Patent Number: 6,072,392

[45] Date of Patent: Jun. 6, 2000

[54] APPARATUS AND METHOD FOR MONITORING AND RECORDING THE AUDIBLE ENVIRONMENT OF A CHILD, PATIENT, OLDER PERSON OR PET LEFT IN THE CARE OF A THIRD PERSON OR PERSONS

[75] Inventors: Herbert Jefferson Henderson, Laurel, Md.; Jose Armando Coronado, 6387 Smithy Sq., Apt. B, Glen Burnie, Md. 21061; Jorge Ivan Negron, 1510 NW. 128 Dr. Apt., Sunrise, Fla. 33323

[73] Assignees: Jose Armando Coronado; Jorge Ivan Negron, both of Laurel; Leonard Bloom, Towson, all of Md.

[21] Appl. No.: 09/132,065

[22] Filed: Aug. 10, 1998

[51] Int. Cl.$^{7}$ .............................. G08B 1/08; G11B 5/00

[52] U.S. Cl. .................. 340/539; 340/573.1; 340/573.4; 340/692; 360/5; 360/12; 360/55; 381/56; 369/53; 367/198

[58] Field of Search .............................. 340/539, 573.1, 340/692, 573.4; 381/56, 57; 360/5, 55, 12; 369/29, 31, 53, 63; 367/197–199

[56] References Cited

U.S. PATENT DOCUMENTS

| | | | |
|---|---|---|---|
| 4,481,504 | 11/1984 | Scott, II | 340/573 |
| 4,541,191 | 9/1985 | Morris et al. | 42/1 A |
| 4,980,671 | 12/1990 | McCurdy | 340/568 |
| 5,045,327 | 9/1991 | Tarlow et al. | 381/51 |
| 5,119,072 | 6/1992 | Hemingway | 340/573 |
| 5,225,947 | 7/1993 | Wilson et al. | 360/72.1 |
| 5,239,587 | 8/1993 | Muckelrath | 381/56 |
| 5,266,944 | 11/1993 | Carroll et al. | 348/825 |
| 5,400,185 | 3/1995 | Scerbo, III | 360/5 |
| 5,495,357 | 2/1996 | Osterhout | 359/152 |
| 5,521,582 | 5/1996 | Kingston | 340/539 |
| 5,546,124 | 8/1996 | Scerbo, III | 348/158 |
| 5,555,536 | 9/1996 | Rolf et al. | 369/19 |
| 5,572,592 | 11/1996 | Muckelrath | 381/56 |
| 5,640,147 | 6/1997 | Chek et al. | 340/573 |
| 5,903,868 | 5/1999 | Yuen et al. | 704/270 |

*Primary Examiner*—Donnie L. Crosland
*Attorney, Agent, or Firm*—Leonard Bloom

[57] ABSTRACT

A remote recording unit, which is worn by a child, monitors the ambient sounds in a day care center (for example) and records selected sound bytes that are played back on a docking unit. The time duration between sound bytes is periodic and re-programmable. The remote recording unit is "childproof" and tamper-evident to generate an internal "flag" which will be displayed on the docking unit, indicating that the remote recording unit was removed by an unauthorized person. The device is equally applicable to a patient, older person or pet left in the care of a third person or persons or placed in a facility or institution.

35 Claims, 31 Drawing Sheets

SOFTWARE BLOCK DIAGRAM, TOP LEVEL

SOFTWARE BLOCK DIAGRAM, REMOTE MODE

SOFTWARE BLOCK DIAGRAM, RTC/LCD INIT MODE

APPARATUS AND METHOD FOR MONITORING AND RECORDING THE AUDIBLE ENVIRONMENT OF A CHILD, PATIENT, OLDER PERSON OR PET LEFT IN THE CARE OF A THIRD PERSON OR PERSONS

FIELD OF THE INVENTION

The present invention relates to a means for monitoring sounds in the environment whenever a child, older person, patient or pet is left in the care of a third person or persons and, more particularly, to a "childproof" and tamper-evident recording unit worn by the child, older person, patient or pet for recording sound bytes at various selected times while in the care of the third person or persons.

BACKGROUND OF THE INVENTION

A large majority of the mothers with young children are now part of the work force, and thus these mothers are required to leave their children (some of whom are infants) with day care centers or else employ a live-in nanny or an au pair.

According to a nationally-projectable poll conducted by PARENTS MAGAZINE, almost seventy-five percent of families in the United States now use some form of child care; and many are unhappy with that care.

Moreover, there are reported cases where the child was exposed to a very undesirable environment or even subjected to abuse or violence. While these cases are in the minority or somewhat isolated, nevertheless they were indeed shocking and alarming; and as in other situations, the perception becomes the reality.

As a result, the parents are under stress and anxiety on the job and, of course, are worried about leaving their children in the temporary care of another about whom they often know very little (such as a stranger). This stress reduces job efficiency and production.

More recently, parents have installed hidden video cameras in an attempt to monitor in-home nannies or babysitters; these are stationary systems, not portable, and are expensive to install and to maintain.

Similar situations arise whenever an older person, geriatric or other patient, or even a pet, is left in the care of another or in a facility or institution (and either on a temporary basis or for an indefinite length of time).

In the prior art, attempts have been made to monitor child activity. For example, a commercially-available product basically consists of an FM transmitter attached to a baby's crib and transmitting a signal to a receiver close to the parent or parents elsewhere in the home.

Similarly, U.S. Pat. No. 5,119,072 issued in 1992 discloses a transmitter attached to a child's arm and having an antenna for broadcasting an FM RF signal. A receiver is carried by the parent or guardian; and when the amplitude of the carrier field strength is less than a predetermined threshold value, an alarm is sounded to indicate that the child is out of the desired range.

While these prior art solutions are interesting concepts and perhaps useful for the purposes intended, they are not completely satisfactory.

SUMMARY OF THE INVENTION

Accordingly, it is an object of the present invention to provide a "childproof" and tamper-evident remote recording unit intended to be worn like a bracelet around a child's wrist or ankle.

This remote recording unit monitors the environment at periodic intervals to determine whether or not a sound is present. If sounds are present, the sounds are recorded for a brief time period (approximately 10 seconds) constituting sound bytes. Post processing is performed to determine the sound content of each sound byte as measured in units of time. If the sound content meets or exceeds a minimum threshold value, then the sound byte is retained in non-volatile memory. If the sound content is insufficient, then the message is deleted so that the memory space occupied by the deleted message will be available for a future sound byte. At the end of the day, the parents are able to connect the remote recording unit to a docking unit and listen to the recorded sound bytes.

When the remote recording unit is attached to a child, the operating mode is referred to as the "remote mode". Likewise, when the remote recording unit is attached to the docking unit, the operating mode is referred to as the "docking mode".

While in the remote mode, a tamper detection switch remains open as long as the remote recording unit is attached to the child. In order to remove the remote recording unit from the child, a manually-manipulatable latching member (preferably comprising a swivel post) must be actuated. The actuation of this swivel post causes the tamper detection switch to generate an internal "flag", indicating that the remote recording unit has been removed. This flag enables the recording unit to track the time of day when the recording unit is attached to and removed from the child While in the docking mode, the time of day when the remote recording unit was last attached to the child is automatically displayed on an LCD. This time of day allows the parents to immediately figure out whether or not the remote recording unit was removed during the day. After this, the parents are able to play back the recorded sounds. As each sound is replayed, the time of day when the sound was recorded is displayed on an LCD. If the remote recording unit was removed during the day then a brief alarm will sound in chronological sequence as the sound bytes are replayed. As the alarm sounds, the time of removal will be displayed on an LCD. Following the alarm, any sounds occurring at the time of removal will be played back. While listening to recorded messages, the parent can skip forward to the next message, skip back to the previous message, or skip all the way to the beginning of all messages. While in the docking mode, the parent is also able to set the internal digital clock and program the length of time between recording sessions.

Viewed in another aspect, the present invention provides an apparatus for monitoring background sounds when a child, patient or pet is left in the temporary care of a third person or persons. This apparatus includes a remote recording unit worn by or otherwise attached to the child, patient or pet and being substantially "childproof", such that the remote recording unit cannot normally be removed by the child, patient or pet. The remote recording unit monitors and records background sound bytes at respective times and for given intervals during the time the child, patient or pet is left in the temporary care of the third person or persons. A tamper detection means in the remote recording unit generates an internal "flag" indicating that the remote recording unit was improperly removed by an unauthorized person or persons. Means are provided to enable the parent, guardian or pet owner to remove the remote recording unit from the child, patient or pet, and for playing back the recorded sound bytes, thereby determining whether the child, patient or pet was abused or mistreated or subjected to an undesirable environment while in the care of the third person or persons.

Preferably, the means for playing back the recorded sound bytes comprises a docking unit. The docking unit displays the time of day when each sound byte was recorded, the time of day when the recording unit was last "armed," and each time of day when the recording unit was "disarmed." This docking unit is also provided with "fast forward", "reverse", "skip" and "pause" features, respectively. As a result, a quick sample of the environment is obtained, one which is condensed, and it is not necessary to run through an 8-hour video to see if your child was mistreated or subjected to an undesirable environment. The sampling is on a periodic basis, such that the time interval between recordings may be programmed and re-programmed while the remote recording unit is connected to the docking unit.

The remote recording unit is readily visible (indeed, it is preferably somewhat conspicuous) and its very presence acts as a deterrent to possible abuse, as well as foul language.

In a preferred embodiment, the remote recording unit is powered by a rechargeable battery, which is automatically recharged when the remote recording unit is connected to the docking unit.

The remote recording unit includes a resiliently-biased member having an "armed" and a "disarmed" position for detecting unauthorized removal of the remote recording unit; and the mechanical design of the remote recording unit is such that the resiliently-biased member is in an open-circuit condition in its "armed" position, thereby substantially reducing battery drainage.

In a preferred embodiment, the resiliently-biased member comprises a manually-manipulatable swivel post.

The docking unit has a plurality of connector pins, and the remote recording unit has a corresponding plurality of connector sleeves receiving the connector pins, respectively, on the docking unit. The remote recording unit includes a microphone, and the docking unit includes a speaker for broadcasting the recorded sound bytes. In lieu of a speaker, the docking unit may be provided with a phonojack for connection to a speaker.

These and other objects of the present invention will become apparent from a reading of the following specification taken in conjunction with the enclosed drawings.

BRIEF DESCRIPTION OF THE DRAWINGS

FIG. 12 shows the swivel post in its "armed" position, ready to activate the circuitry in the remote recording unit to generate an internal "flag" indicating that the remote recording unit was improperly removed by an unauthorized person.

FIG. 13 corresponds to FIG. 12, but shows the swivel post in its "unarmed" (or "disarmed") position to permit removal of the wrist strap.

FIG. 14 shows the swivel post in its "disarmed" position, ready for docking of the remote recording unit.

FIG. 15 shows the swivel post in its "armed" position, nested within the housing of the remote recording unit.

FIG. 16 shows the swivel post partially rotated to clear an arcuate shoulder (on its cap) from a cooperating arcuate ledge formed in the housing.

FIG. 17 shows the swivel post thereafter being axially extended from the housing, corresponding to the "disarmed" position of the swivel post, and wherein an internal "flag" is thereby generated in the circuitry of the remote recording unit.

FIG. 30 is a block diagram of the top level showing three modes.

FIG. 31 is a block diagram of the docking mode.

FIG. 32 is a block diagram of the remote mode.

FIG. 33 is a block diagram of the unit mode.

DESCRIPTION OF THE PREFERRED EMBODIMENTS

Figure 1:
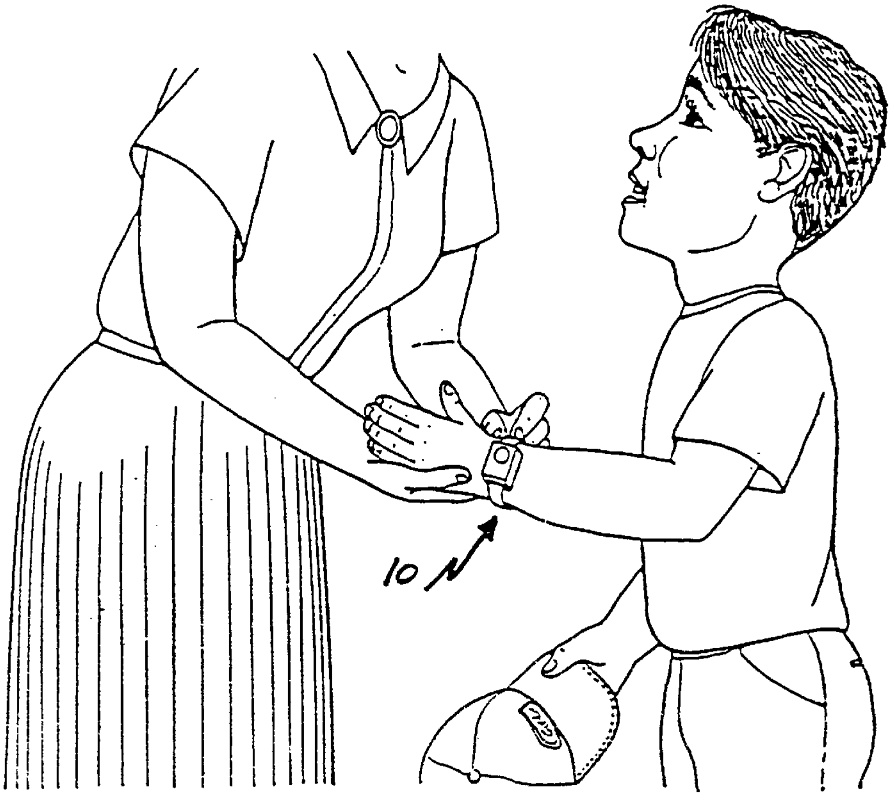
FIG. 1 is a pictorial view, showing the remote recording unit of the present invention being attached by a working mother to the wrist of her child (in this case, a young boy).
Figure 2:
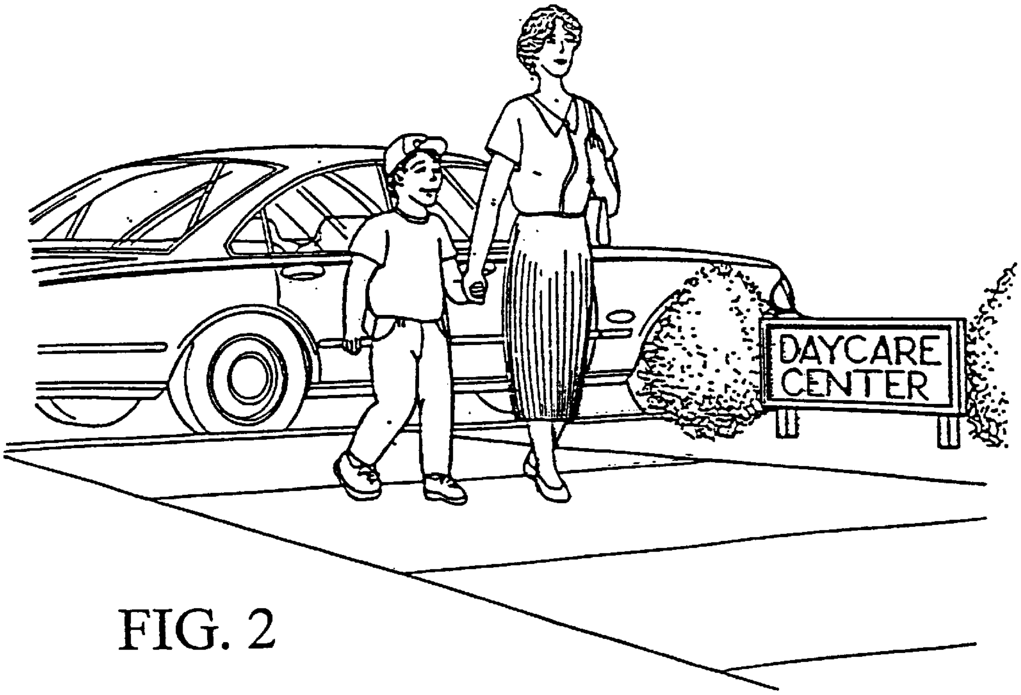
FIG. 2 is a further pictorial view, showing the working mother dropping her boy off at the day care center.
Figure 3:
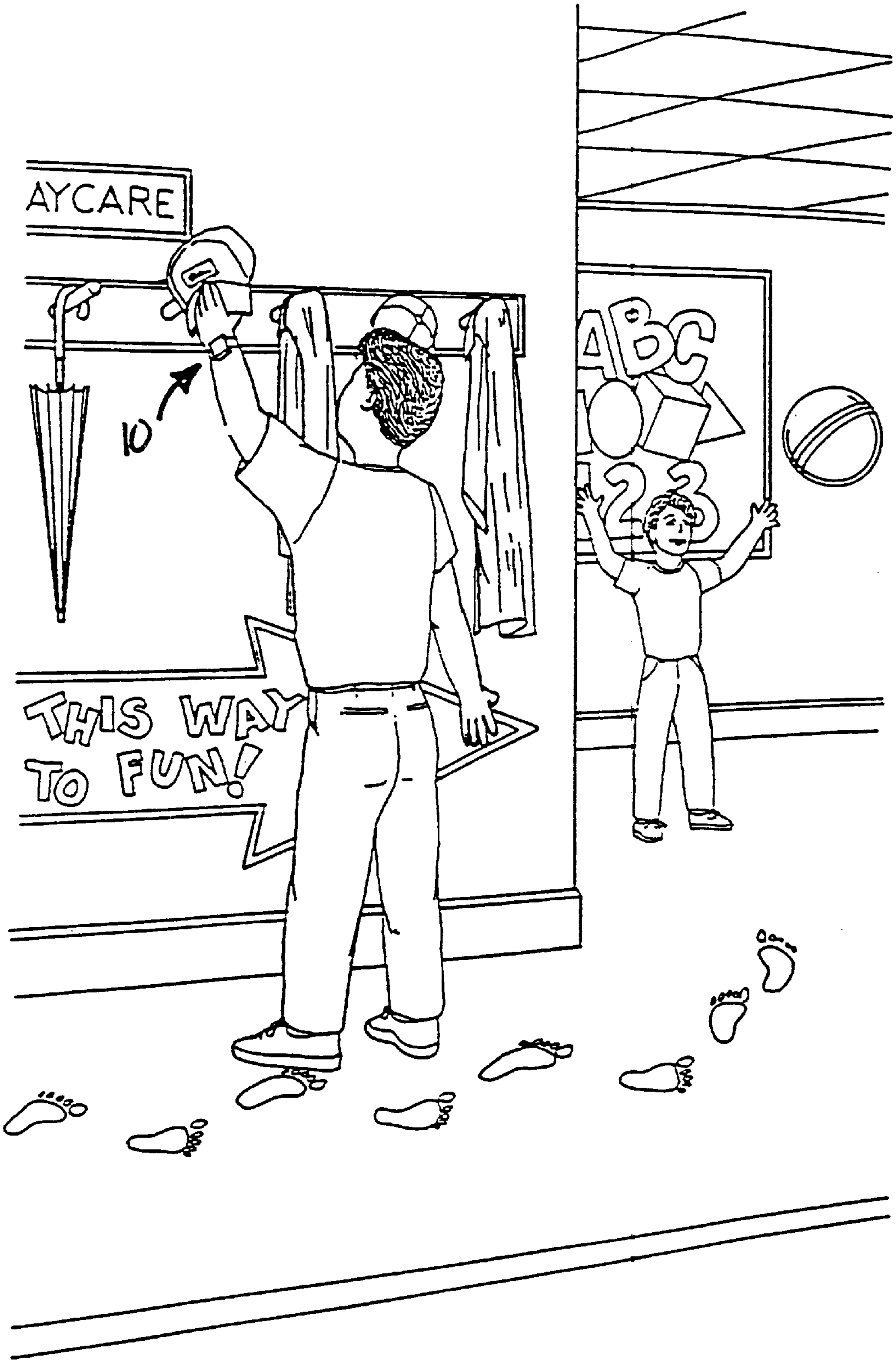
FIG. 3 is a still further pictorial view, showing the boy wearing the remote recording unit on his wrist (and in clear view).
Figure 4:
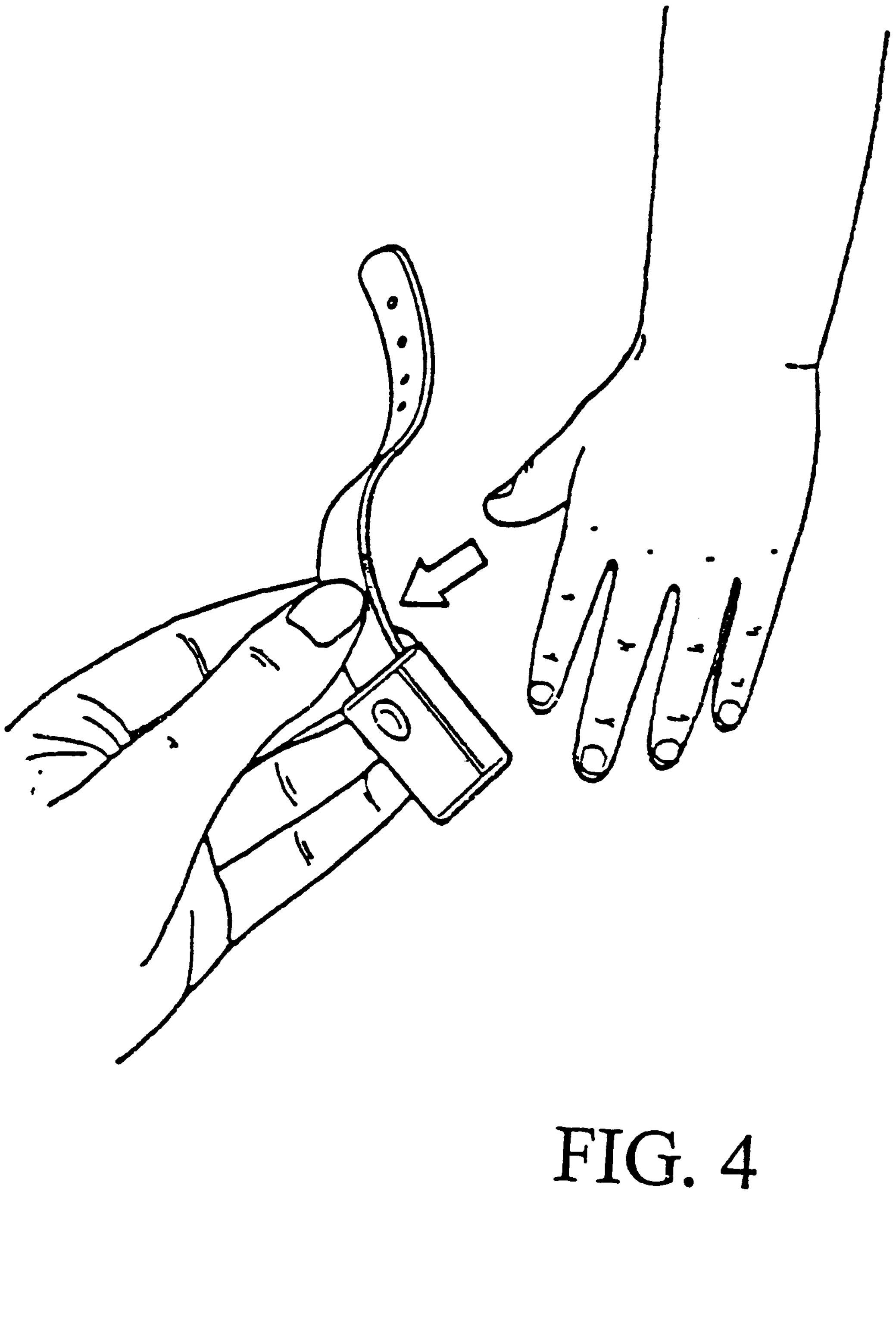
FIG. 4 is a partial pictorial view, showing removal of the remote recording unit.
Figure 5:
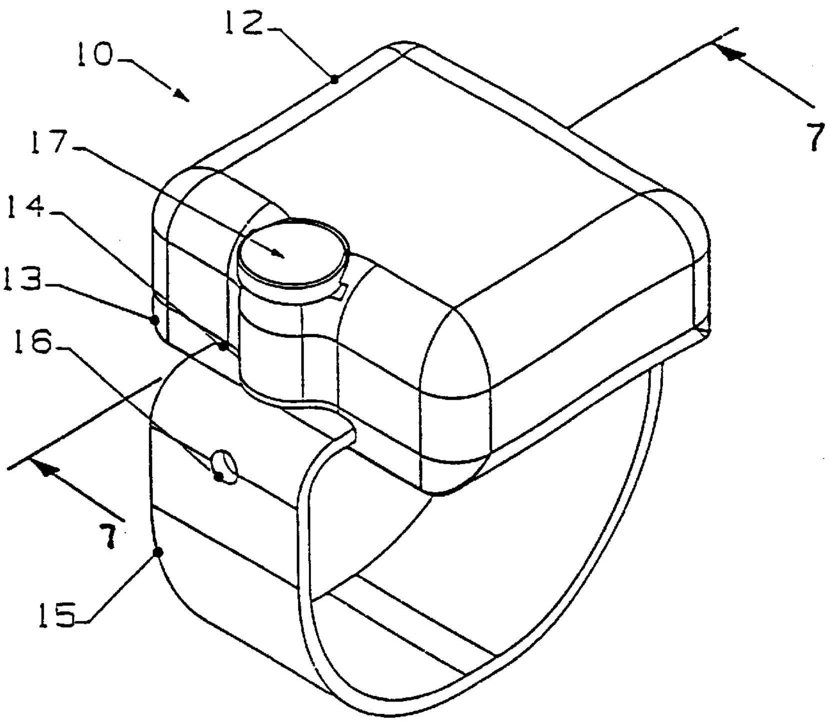
FIG. 5 is a perspective view of the remote recording unit of the present invention, showing the wrist strap connected thereto.

With reference to FIG. 1, a working mother is shown attaching the remote recording unit 10 of the present invention to the wrist of her young son. In FIG. 2, the boy is taken by his mother to the day care center, and in FIG. 3 the boy wears the remote recording unit 10 while at the day care center. The remote recording unit 10 is fairly conspicuous which, by itself, will act as a deterrent to child abuse or mistreatment.

The remote recording unit 10 (as hereinafter described) will record sound bytes during the time that the boy is at the day care center.

Figure 21:
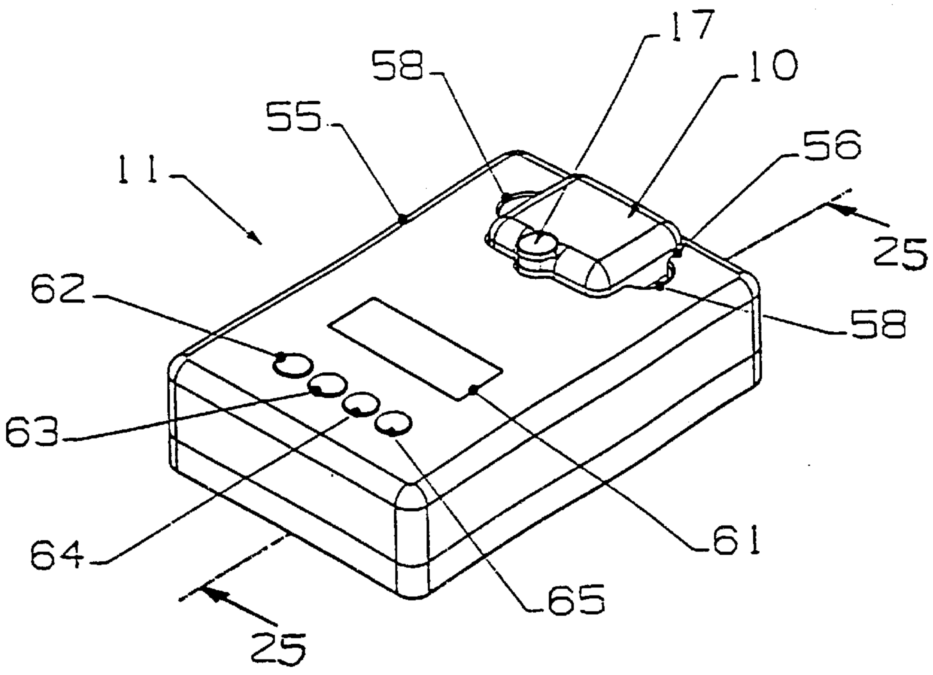
FIG. 21 is a perspective view of the docking unit of the present invention, showing the remote recording unit in the docked position.
Figure 22:
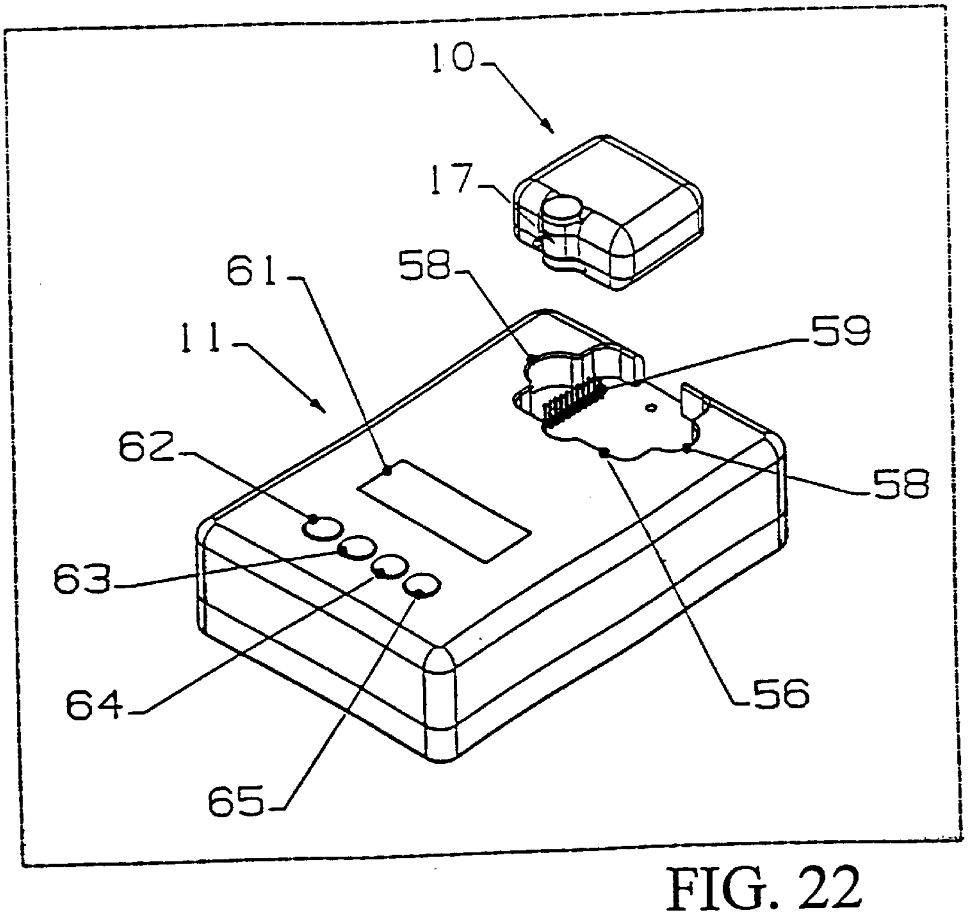
FIG. 22 is a further perspective view of the docking unit, corresponding substantially to FIG. 21, but showing the remote recording unit in exploded relationship to the docking unit, and further showing the plurality of docking connector pins in the docking unit.

Upon picking up her boy from the day care center and taking him home, the mother will remove the remote recording unit 10 (basically the reverse of FIG. 1) and insert the remote recording unit 10 into a docking unit 11 (shown in FIGS. 21 and 22) to play back the sound bytes recorded by the remote recording unit 10 (as hereinafter described in detail) to determine if the boy was abused, mistreated or exposed to an undesirable environment. These recorded sound bytes are "compressed" for playback, taking up roughly five to ten minutes, and the mother may listen to the playback while driving home or when preparing dinner; and it is not necessary to visually scan a video tape or else listen to an audio tape encompassing an entire eight or ten hour day.

While the recorded sound bytes (either random or programmed) encompass only brief sampling "windows", nevertheless, equipping a child with the remote recording unit 10 of the present invention, by itself, serves as a deterrent since the child care provider does not know precisely when the remote recording unit 10 is "ON".

As illustrated herein, the remote recording unit 10 has been attached to the wrist of a young child, but it will be understood that the remote recording unit 10 could be attached to the ankle of the child. Moreover, the disclosure and teachings of the present invention are equally applicable to a patient, older person or even a pet left in the care of a third person or persons or placed in a facility or an institution.

With this in mind, and with reference to FIGS. 5–11, the remote recording unit 10 includes a housing 12 suitably secured to a base 13. The base 13 has a through slot 14 formed therein for receiving a wrist strap 15. The wrist strap 15 has a plurality of spaced-apart holes 16 for receiving a resiliently-biased swivel post 17 comprising a tamper-detection switch.

In a preferred embodiment shown more clearly in FIGS. 7–11, this swivel post 17 includes an enlarged cap 26 and an integral stem 19 provided with an intermediate annular notch 20 which divides the stem 19 into upper and lower portions or sections. The lower section of the stem 19 extends through the slot 14, into one of the holes 16 in the wrist strap 15, and into a clearance hole 21 in the base 13.

Figure 7:
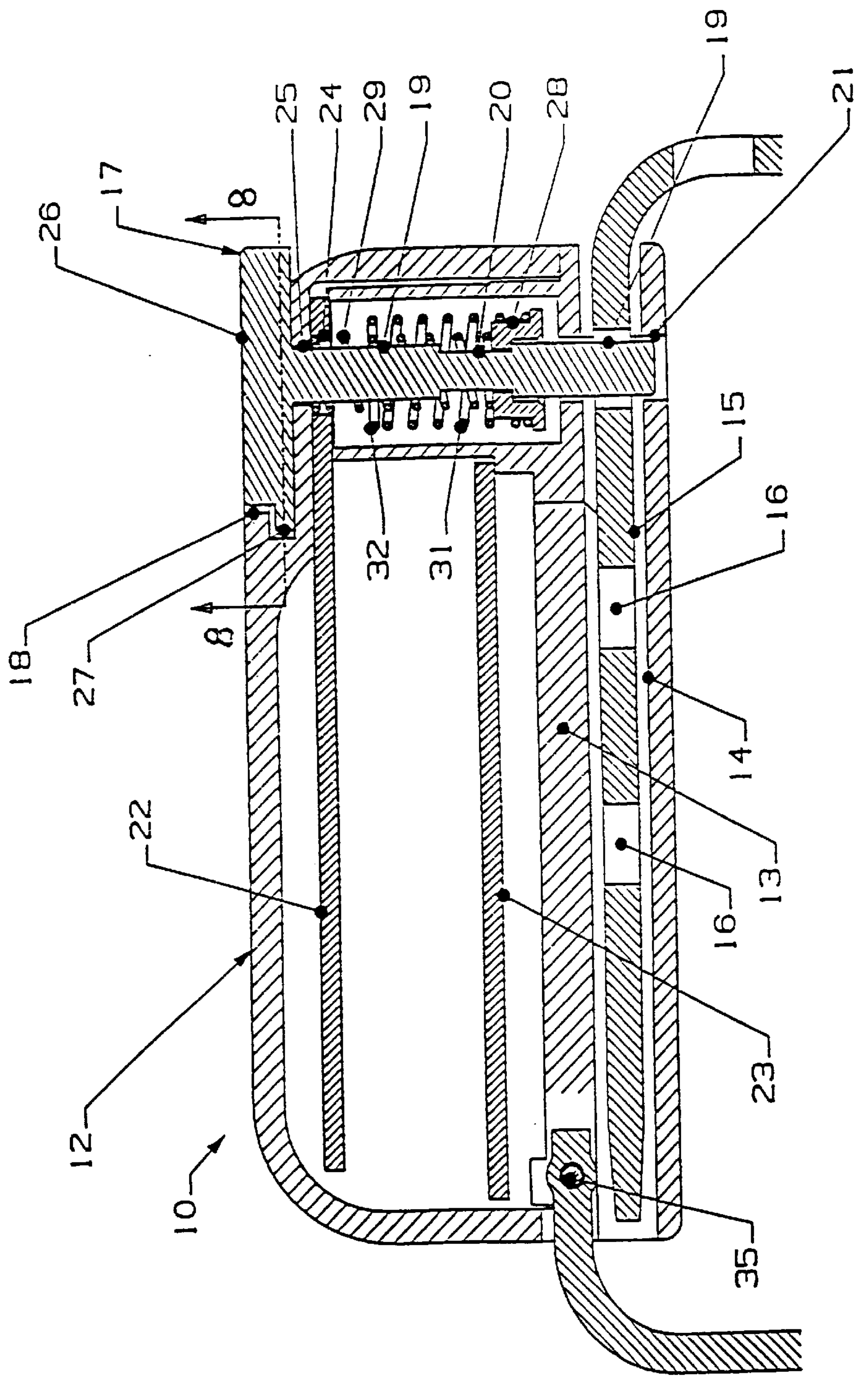
FIG. 7 is a longitudinal cross-sectional view of the remote recording unit, taken along the lines 7—7 of FIG. 5 and drawn to an enlarged scale (with the wrist strap being broken off for ease of illustration) and wherein the swivel post is in its "armed" position.
Figure 8:
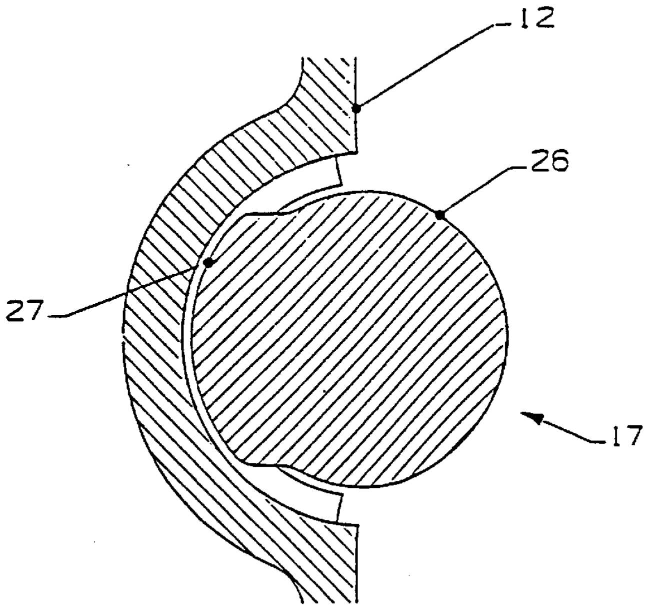
FIG. 8 is a detailed section view taken along the lines 8—8 of FIG. 7 and showing the arcuate shoulder on the cap of the swivel post cooperating with an arcuate ledge on the housing.
Figure 10:
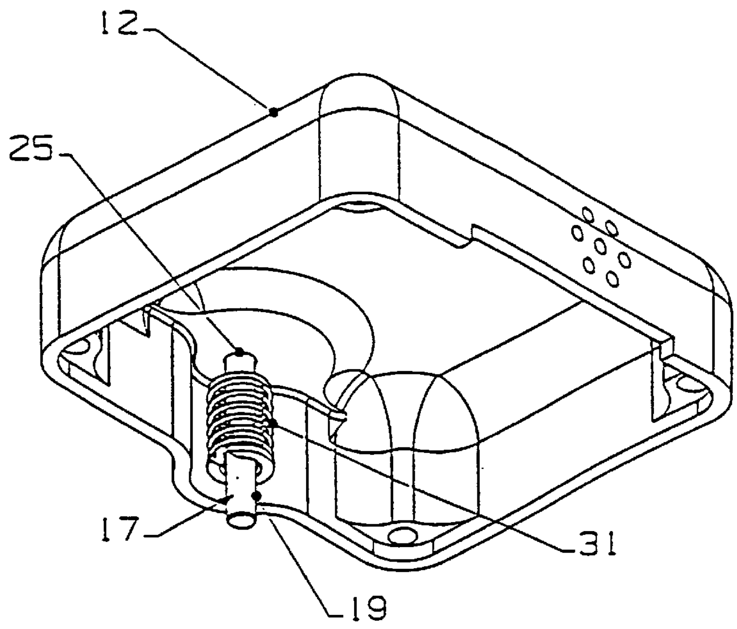
FIG. 10 is a bottom perspective view of the housing for the remote recording unit (showing only the resiliently-biased swivel post).

The housing 12 of the remote recording unit 10 has a top printed circuit board ("PCB") 22 and a bottom PCB 23 (hereinafter described in detail) and the upper section of stem 19 of the swivel post 17 extends through an opening 24 formed in the top PCB 22 and through an opening 25 in the housing 12 (FIGS. 7 and 10).

The enlarged cap 26 on the stem 19 of the swivel post 17 has an arcuate shoulder 27 formed thereon for cooperation with a complementary arcuate ledge 18 on the housing 12 (as shown more clearly in FIGS. 7–9) thereby latching the swivel post 17 to the housing 12.

A shouldered spring retainer 28 is mounted on to the annular notch 20 on the stem 19 of the swivel post 17, transversely thereof.

Figure 11:
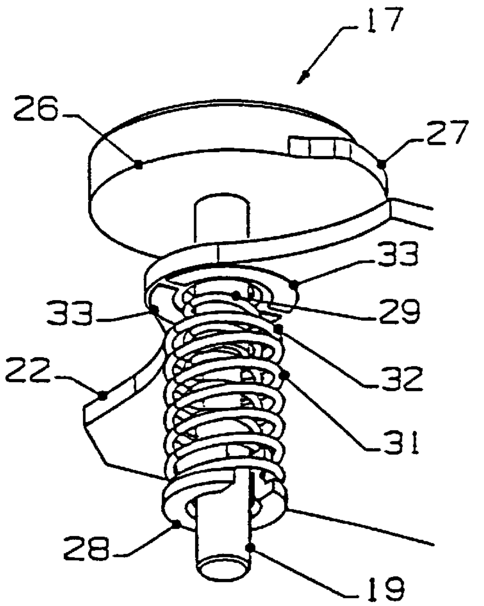
FIG. 11 is a perspective view of the swivel post within the housing, showing the compression spring for resiliently biasing the swivel post, and further showing the switch contact spring radially of the compression spring.
Figure 14:
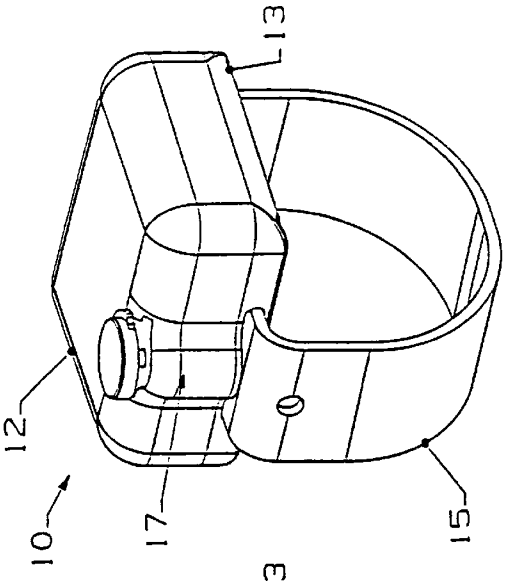
FIGS. 12–14 are respective perspective views of the remote recording unit, showing the swivel post in its alternate positions.
Figure 13:
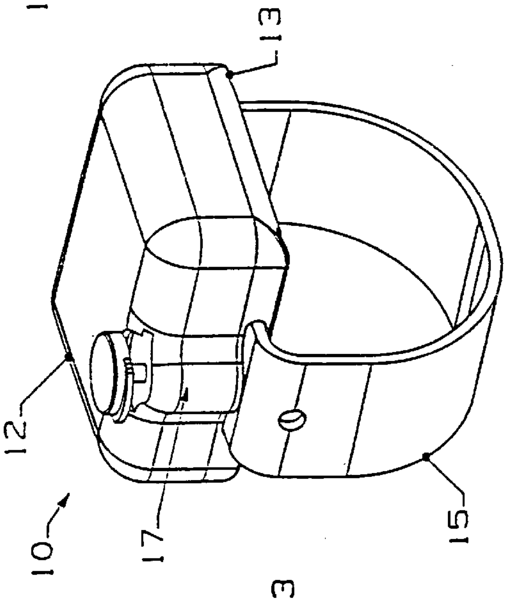
Figure 12:
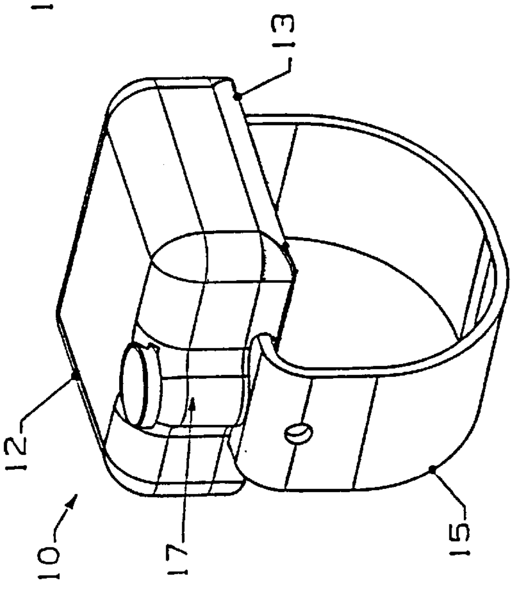
Figure 17:
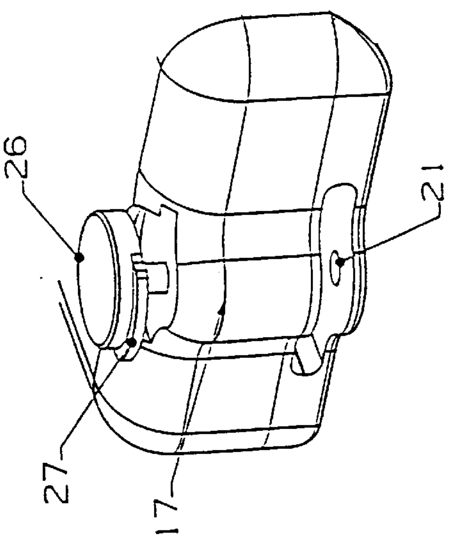
FIGS. 15–17 are perspective views of the swivel post (drawn to an enlarged scale) and corresponding to FIGS. 12–14, respectively, and showing the alternate positions of the swivel post.
Figure 16:
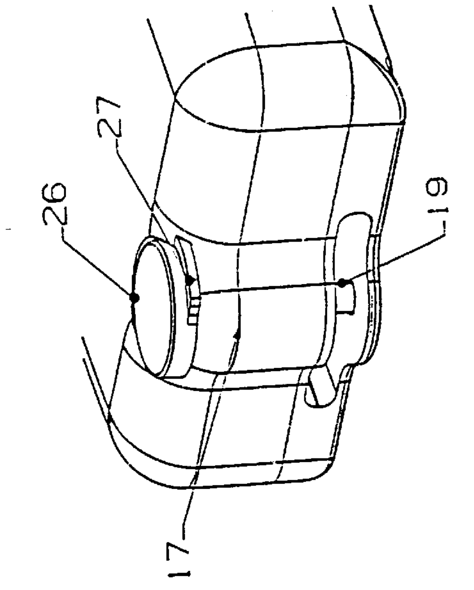
Figure 15:
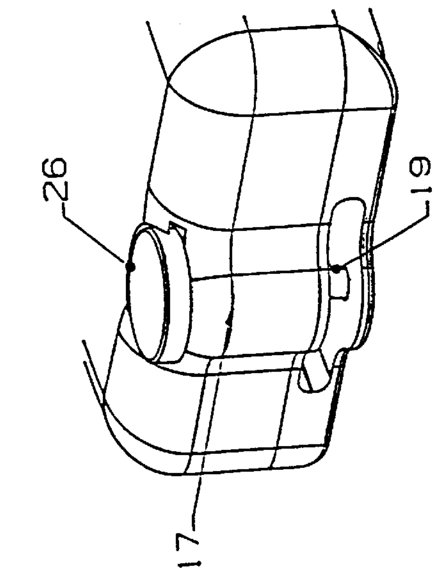

During assembly, the annular notch 20 in the swivel post 17 receives a corresponding slot in the spring retainer 28 (see FIG. 11). Subsequently, the lower ledge of annular notch 20 supports the spring retainer 28 after the spring retainer 28 has been piloted downward into its final assembled position with respect to the swivel post 17.

The swivel post 17 is resiliently biased by a coil spring constituting a post compression spring 29. This post compression spring 29 is piloted on the swivel post 17 and is lodged between the housing 12 and the top surface 30 of the spring retainer 28. Regardless of the axial position of the swivel post 17, the post compression spring 29 remains in a compressed state; and thus constantly urges the spring retainer 28 into a seated position on the stem 19 of the swivel post 17.

A switch contact spring 31 has one of its ends seated on an annular shoulder 39 formed on the spring retainer 28, and this switch contact spring 31 is disposed radially of the post compression spring 29 and substantially concentrically thereof. As shown more clearly in FIG. 9, the other end of the switch contact spring 31 is normally spaced away from the top PCB 22 (axially of the swivel post 17) and this constitutes the "armed" position of the swivel post 17. The switch contact spring 31 is canted (or wound) in the opposite direction with respect to the post compression spring 29. This opposite canting prevents the individual coils of the respective springs from becoming interleved as the swivel post assembly 17 is actuated.

As shown more clearly in FIG. 11, when the swivel post 17 is in its "armed" position, the top coil 32 of the switch contact spring 31 is spaced from a pair of spaced-apart contact pads 33. These contact pads 33, which are substantially semi-circular, are formed on the lower surface of the top PCB 22.

Figure 9:
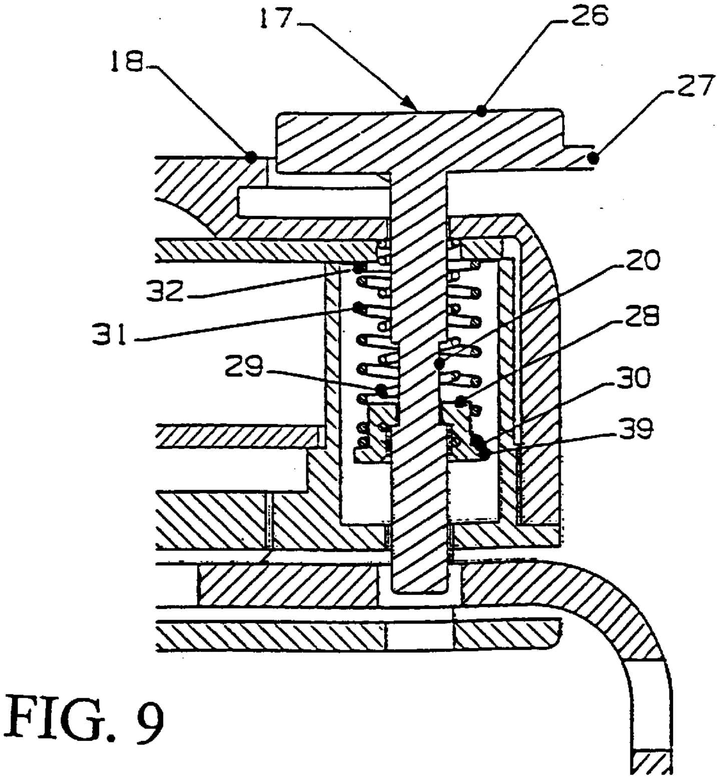
FIG. 9 is a further longitudinal cross-sectional view, corresponding substantially to a portion of FIG. 7, but showing the swivel post in its "disarmed" position for removal of the remote recording unit.

Accordingly, and with further reference to FIGS. 12–14 and FIGS. 15–17, the swivel post 17 must first be manually rotated through an angle to enable the arcuate shoulder 27 on the enlarged cap 26 to clear the arcuate ledge 18 on the housing 12. In this position, the swivel post 17 is "unlocked" or unlatched with respect to the housing 12. Thereafter, the swivel post 17 may be lifted up (manually) against the resilient bias of the post compression spring 29 (as shown in FIG. 9) such that the lower stem portion 19 on the swivel post 17 is removed from the respective hole 16 in the wrist strap 15 and, basically, clears the through slot 14 in the base 13. The wrist strap 15 may then be removed from the slot 14 in the base 13 of the remote recording unit 10 (and from the child).

When the swivel post 17 is thus unlatched and raised, the switch contact spring 31 is likewise raised; and the top coil 32 of the switch contact spring 31 bridges the contact pads 33 on the top PCB 22, thus completing a circuit and (as hereinafter described) generating a "flag" that may be subsequently recalled, thereby indicating that the remote recording unit 10 was improperly removed, or tampered with, by an unauthorized person (as well as the time or times thereof).

Thus, two manual movements are required: first, a rotary movement which is substantially impeded by friction and, second, an axial movement This compound movement renders the remote recording unit 10 substantially "childproof".

Figure 18:
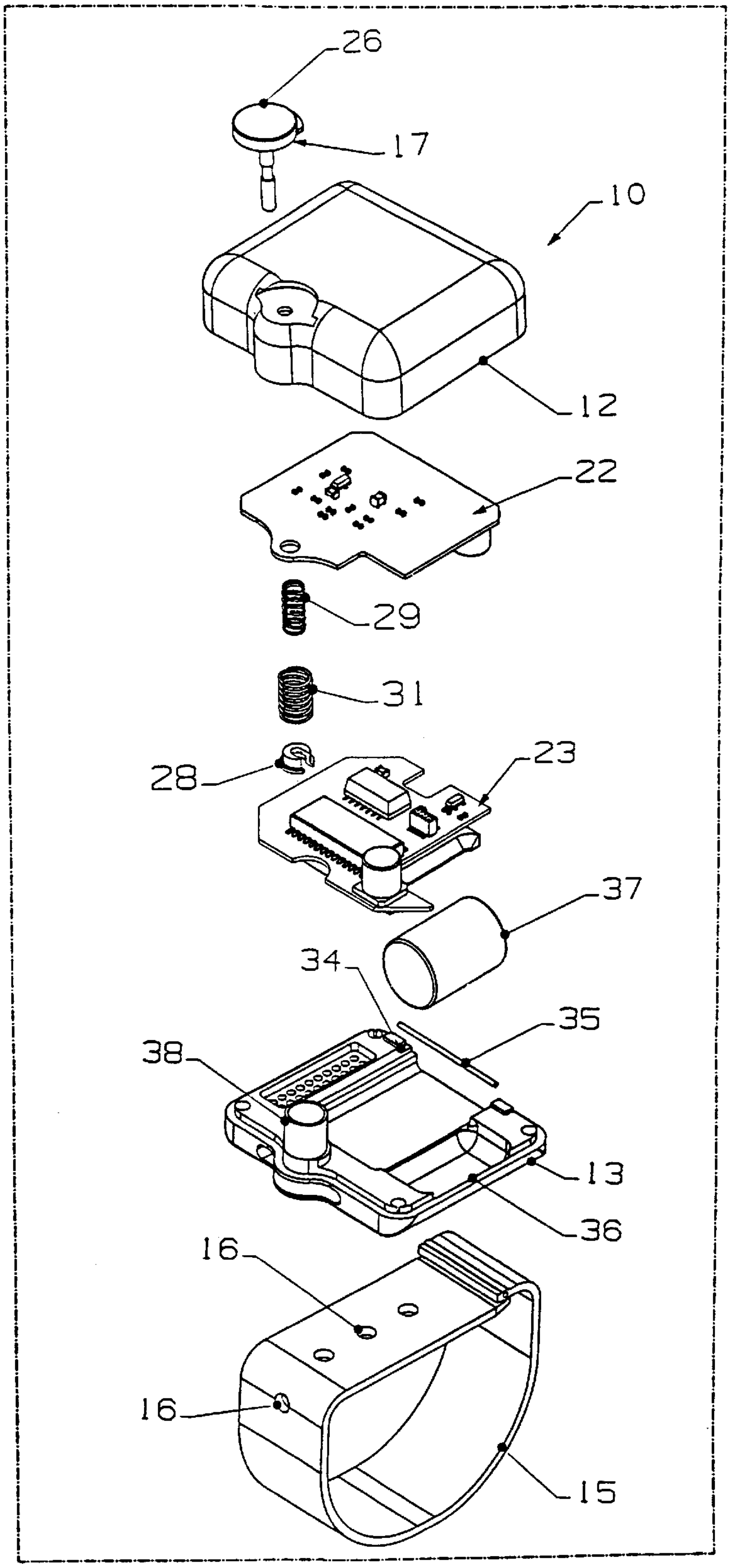
FIG. 18 is an exploded perspective view of the remote recording unit showing (from top to bottom) the swivel post, the housing, the top printed circuit board ("PCB"), the compression spring, the switch contact spring and spring retainer, the bottom PCB, the battery, the wrist strap retention pin, the base and the wrist strap, respectively.

With reference to FIG. 18, the base 13 has a pair of aligned rectangular bosses 34, respectively, for retaining a wrist strap pin 35 therein. This wrist strap pin 35 is received transversely in the wrist strap 15, thereby retaining the wrist strap 15 on the base 13. The base 13 also has a recess 36 for a battery 37 which, preferably, is rechargeable. The base 13 further has an upstanding boss 38 (FIG. 18) for radially confining the switch contact spring 31.

Figure 20:
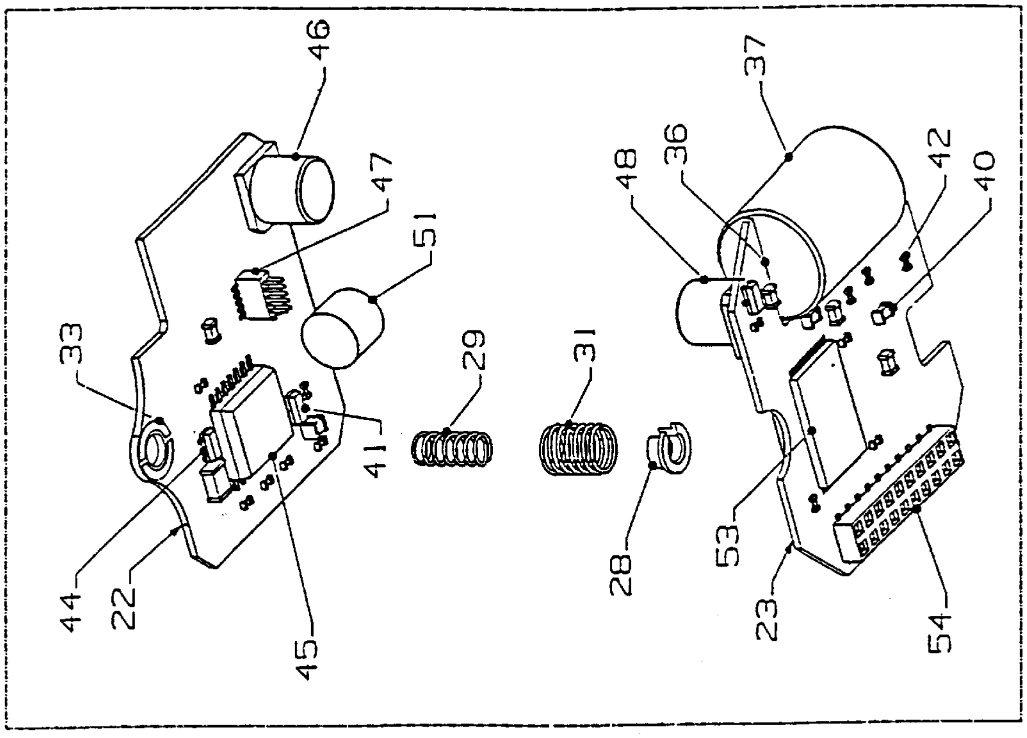
FIG. 20 is a still further exploded perspective view, corresponding substantially to FIG. 19, but showing a bottom view of the components (looking up).
Figure 19:
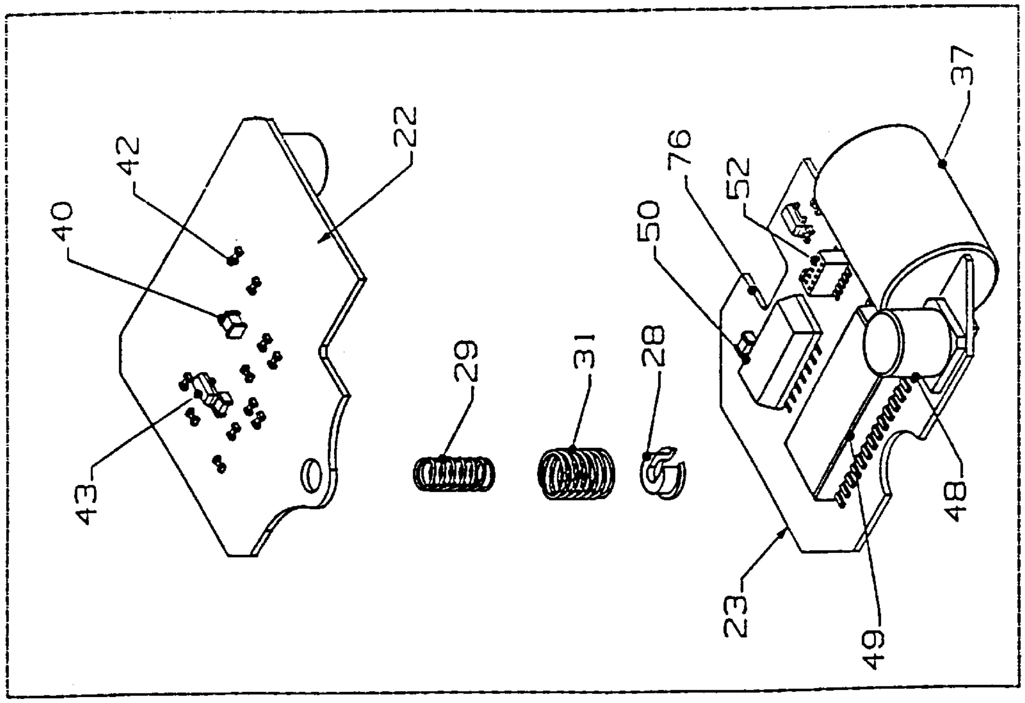
FIG. 19 is a further exploded perspective view, drawn to a somewhat enlarged scale, and showing the two PCB's with the battery mounted on the bottom PCB.

With reference again to FIG. 18, and with further reference to FIGS. 19 and 20, the mechanical arrangement of the major electrical (or electronic) components on the top PCB 22 and the bottom PCB 23 are shown; and it will be appreciated that the actual printed circuitry interconnecting these major components (being conventional) has been omitted for ease of illustration.

With this in mind, the upper surface of the top PCB 22 (FIG. 19) has mounted thereon a plurality of chip capacitors (one of which is indicated as 40), a diode 41, multiple chip resistors (one of which is indicated as 42), and transistors 43 and 44, respectively; and the lower surface of the top PCB 22 (see FIG. 20) has mounted thereon an amplifier 45, a first electrolytic capacitor 46, a microphone 51, and a first board-to-board connector 47. Upon assembly, the microphone 51 is disposed within a recess 76 in PCB 23 and relatively close to the plurality of holes 57 in the housing 12 (shown in FIG. 6) for a clear pick-up of the ambient sounds.

In turn, the upper surface of the bottom PCB 23 (see FIG. 19 again) has mounted thereon a second electrolytic capacitor 48, a controller 49, a real time clock 50, and a second board-to-board connector 52. The lower surface of the bottom PCB 23 (see FIG. 20 again) has mounted thereon a voice memory 53, a docking interface connector 54, a plurality of chip capacitors 40, and a plurality of chip resistors 42.

With reference to FIGS. 21–24, the docking unit 11 has a housing 55 provided with a recess 56 for receiving the remote recording unit 10 in the docking mode. This recess 56 has a pair of opposing semi-circular cut-outs 58 for ease of docking and undocking the remote recording unit 10 in the docking unit 11.

Figure 6:
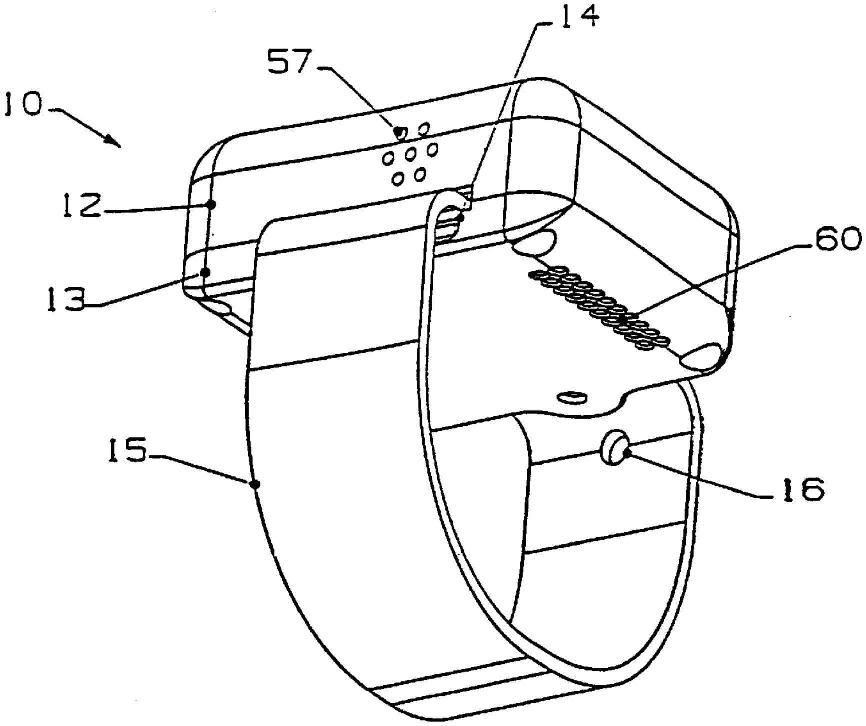
FIG. 6 is a further perspective view of the remote recording unit, taken from a different direction, showing the holes for the microphone in the remote recording unit, and further showing the plurality of alignment holes (for the connector pins on the docking unit).

In this docking mode, a plurality of docking connector pins 59 (see FIG. 22) in the docking unit 11 receive and cooperate with a corresponding plurality of docking connector sleeves 60 in the top housing 12 of the remote recording unit 10 (see FIG. 6).

Figure 23:
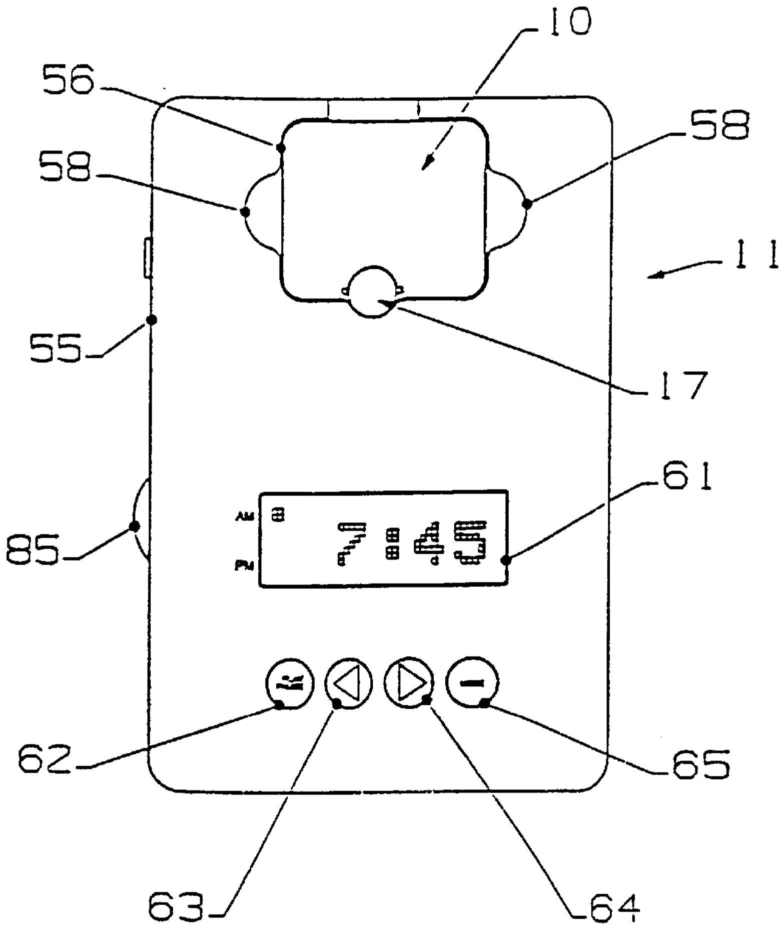
FIG. 23 is a top plan view of the docking unit, showing the LCD (for the time of recordation) and further showing the user interface buttons.
Figure 24:
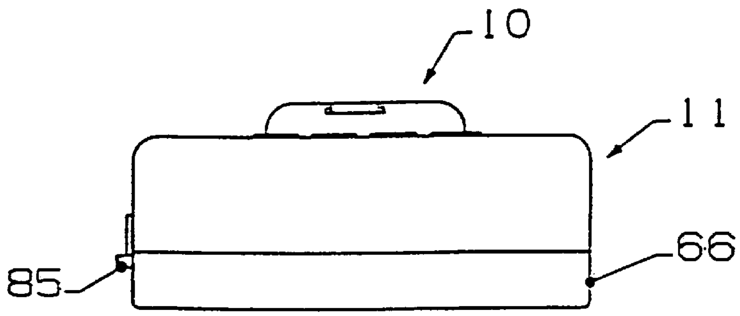
FIG. 24 is an end view of the docking unit shown in FIG. 23.
Figure 25:
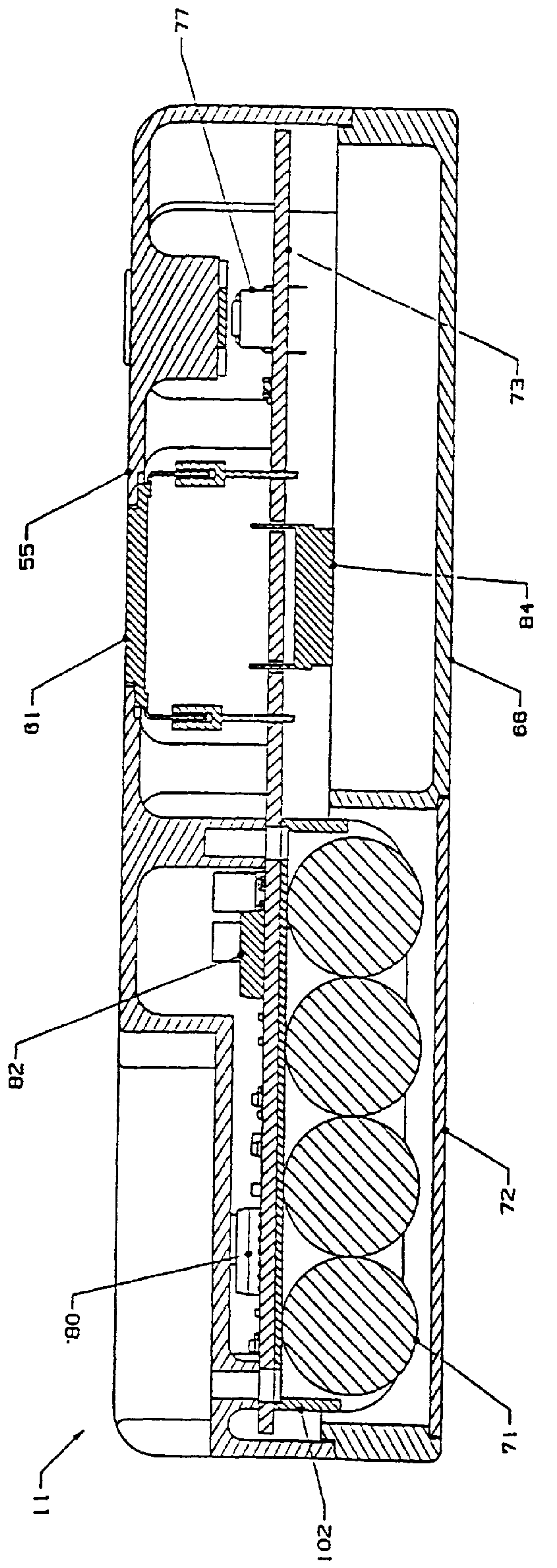
FIG. 25 is a longitudinal cross-section of the docking unit, taken along the lines 25—25 of FIG. 21.

Additionally, and as shown more clearly in FIG. 23, the docking unit 11 has a liquid crystal display ("LCD") 61 indicating the time of day when each sound byte was recorded, as well as the time when (and if) the remote recording unit 11 was improperly removed (and/or tampered with) by an unauthorized person or persons. Further, the docking unit 11 has a plurality of user interface buttons, including a "play/pause" 62, "reverse" 63, "fast forward" 64 and "mode" 65, respectively.

With reference to FIGS. 25–29, the housing 55 of the docking unit 11 is secured to a base 66 by a plurality of self-tapping screws 67. These screws 67 (see FIGS. 26 and 27) pass through openings 68 at the comers of the base 66 and are received in corresponding corner bosses 69 integrally formed in the housing 55. The base 66 also has an opening 70 receiving a plurality of batteries 71 housed in a battery holder 102 (the battery holder is visible in FIGS. 27 and 29). The batteries 71 are type AA (in a preferred embodiment) and are accessible through a removable cover 72.

A PCB 73 is mounted in the housing 55 and is retained therein by a plurality of self-tapping screws 74 which pass through openings 75 in the PCB 73 and are received in a corresponding plurality of downwardly-projecting bosses 103 molded integrally within the housing 55.

Figure 26:
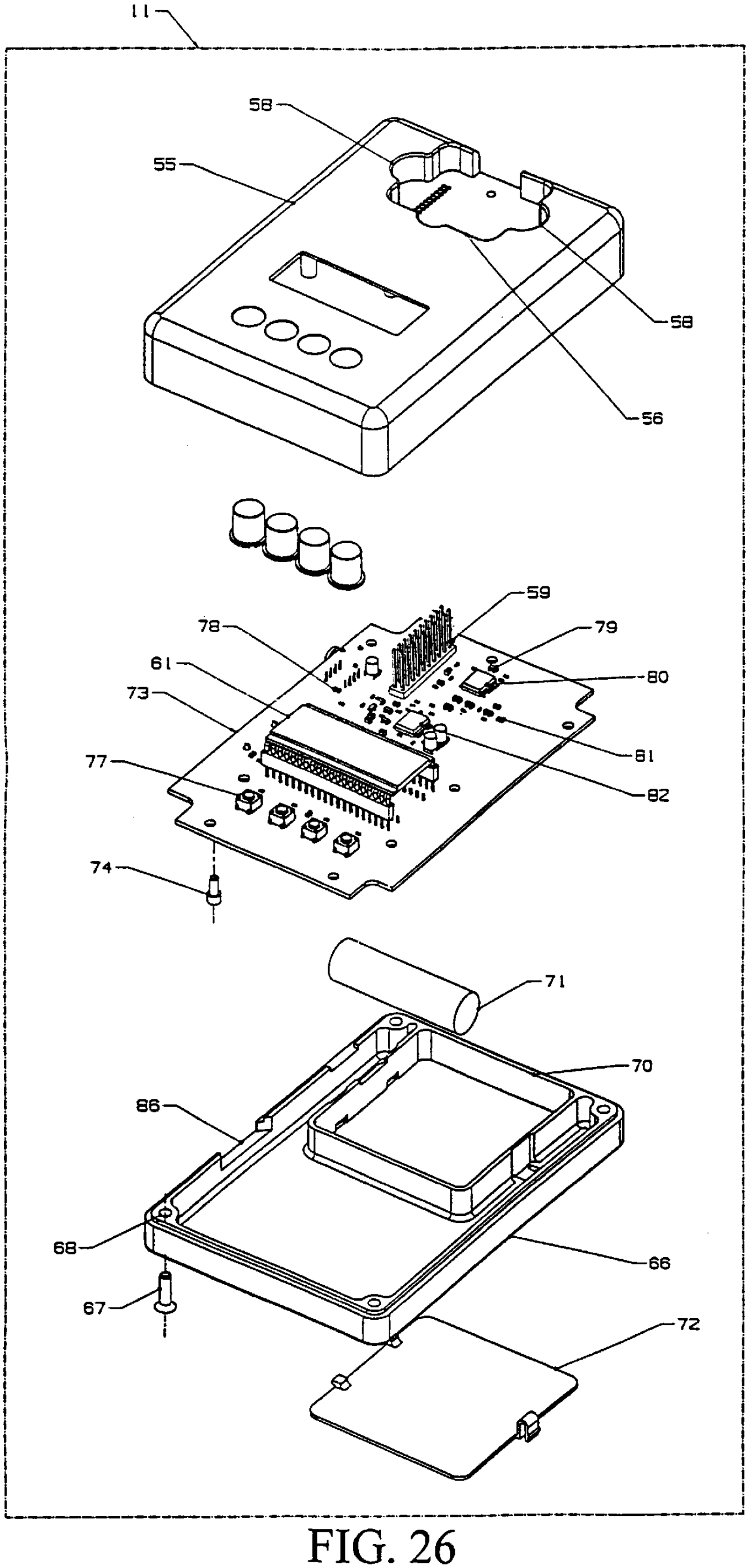
FIG. 26 is an exploded perspective view of the docking unit, showing (from top to bottom) the housing, the push buttons, the PC board, one of the four AA batteries, the base, and the battery cover.
Figure 28:
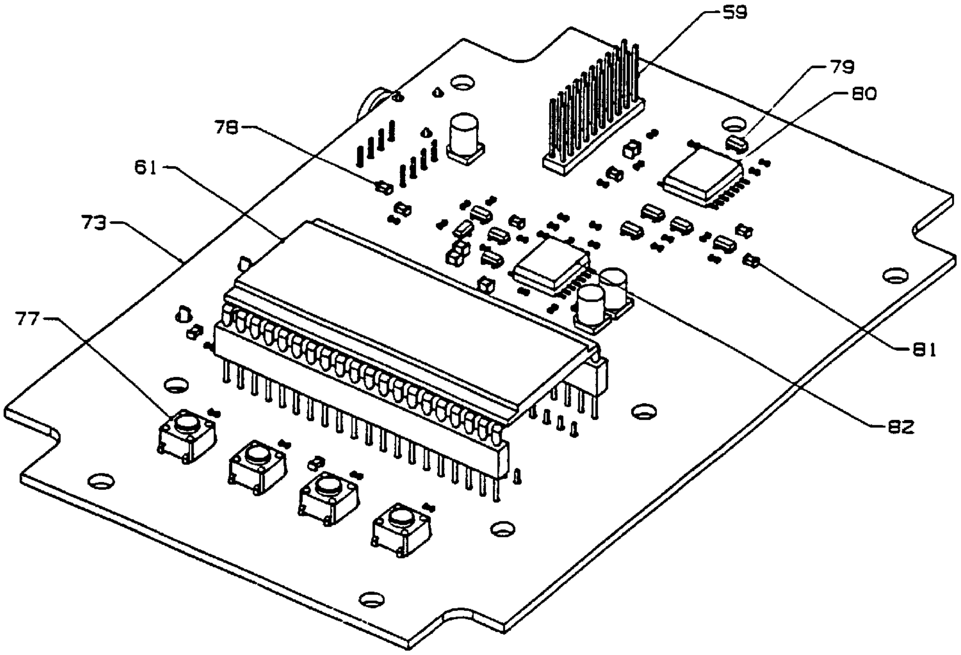
FIG. 28 is a perspective view of the docking unit PCB of FIG. 26, drawn to an enlarged scale, and showing the components of the docking unit PCB mounted on the top side thereof.

As shown more clearly in FIGS. 26 and 28, the top of the PCB 73 has a plurality of push-button switches 77 carrying the user interface buttons 62–65, respectively; and the top of the PCB 73 further has the LCD 61, a plurality of chip capacitors 78, the docking connector pins 59, a plurality of transistors 79, a dual operational amplifier 80, a plurality of chip resistors 81, and a flip-flop circuit 82.

Figure 27:
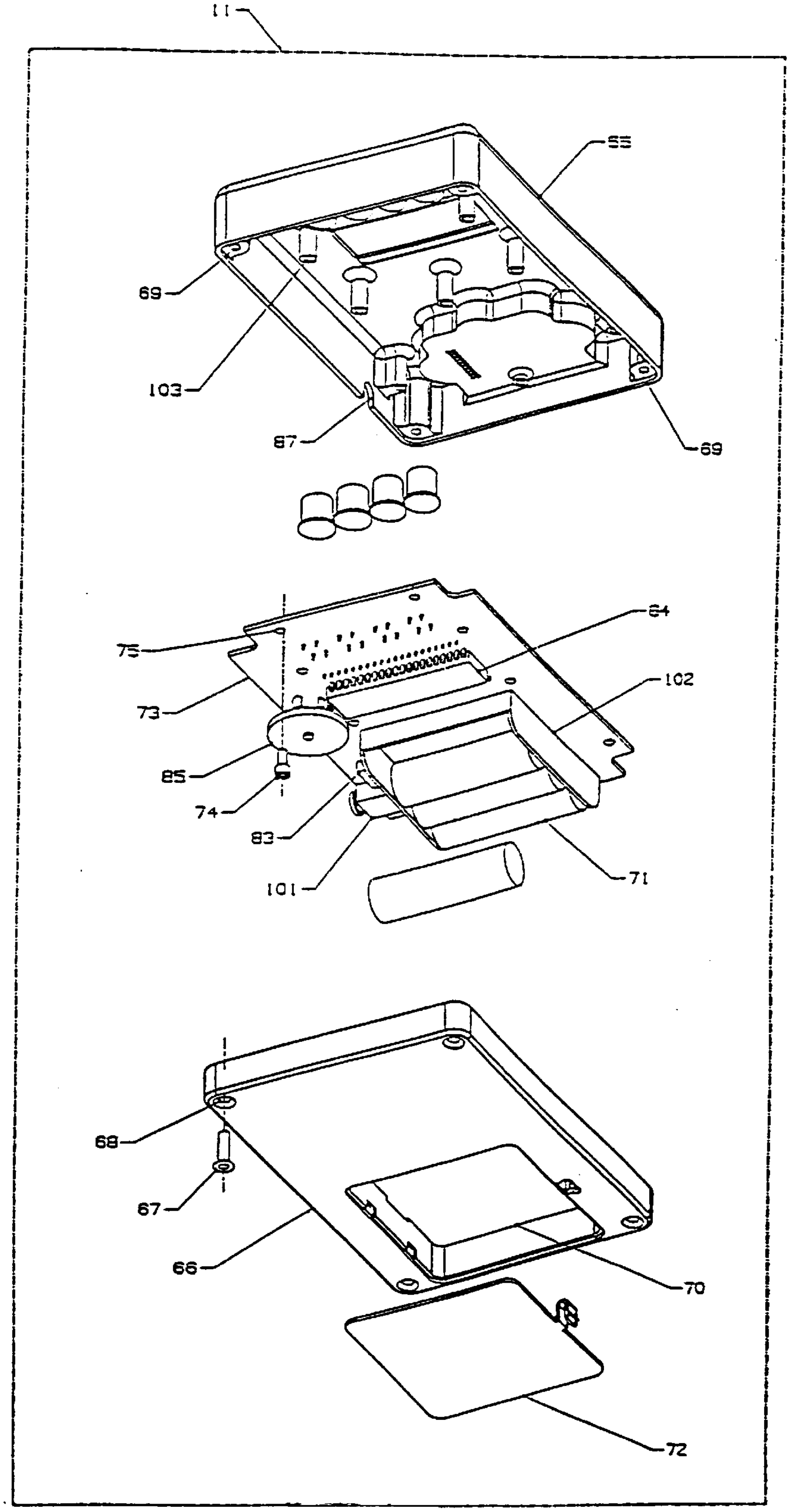
FIG. 27 is a further exploded perspective view, corresponding substantially to FIG. 26, but showing a bottom view of the components of the docking unit (looking up).
Figure 29:
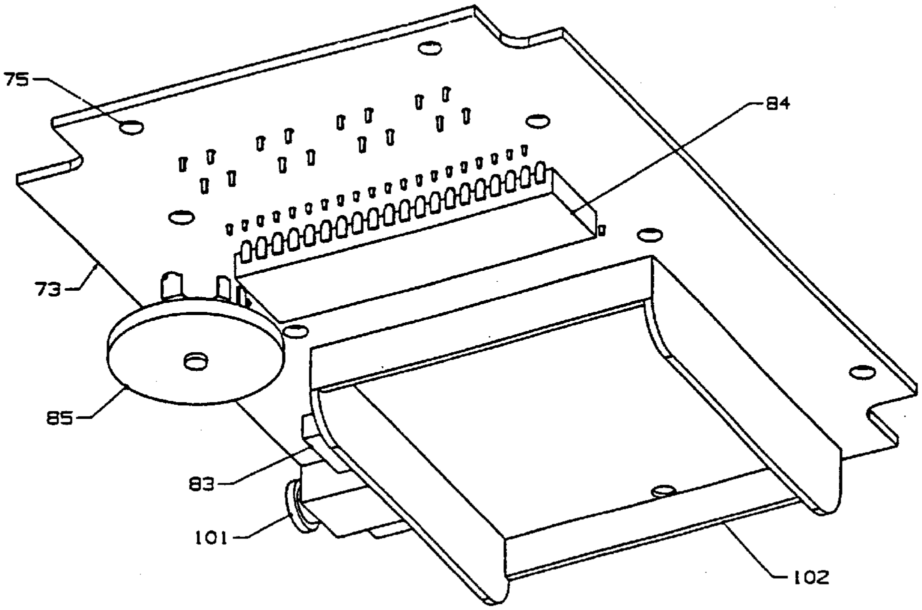
FIG. 29 is a perspective view of the docking unit PCB of FIG. 26, drawn to an enlarged scale, and showing the components of the docking unit PCB mounted on the bottom side thereof.
Figure 30:
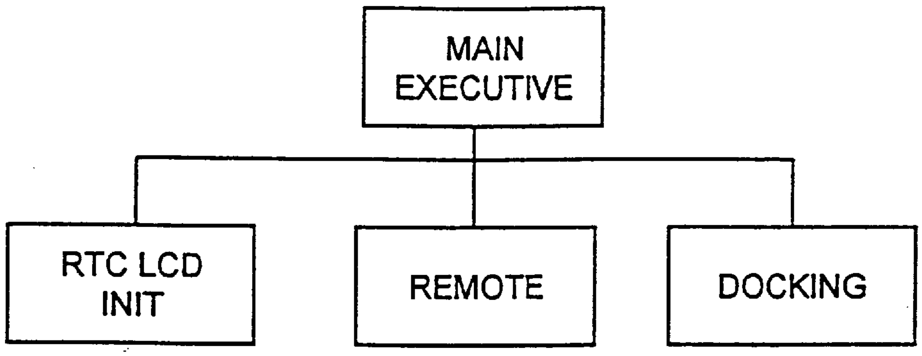
FIGS. 30–33 are block diagrams (or flow charts) of the software used in the remote recording unit.
Figure 31:
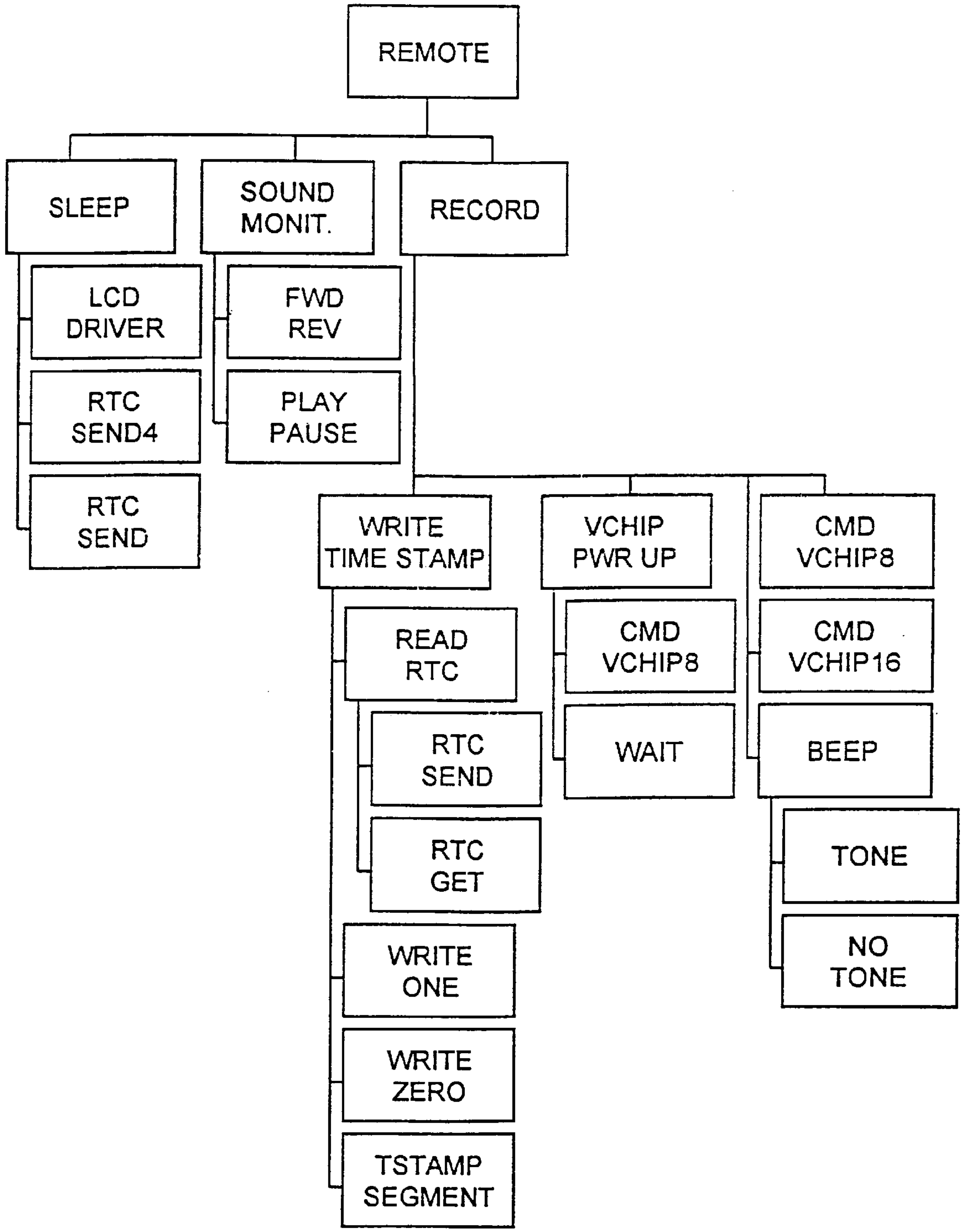
Figure 32:
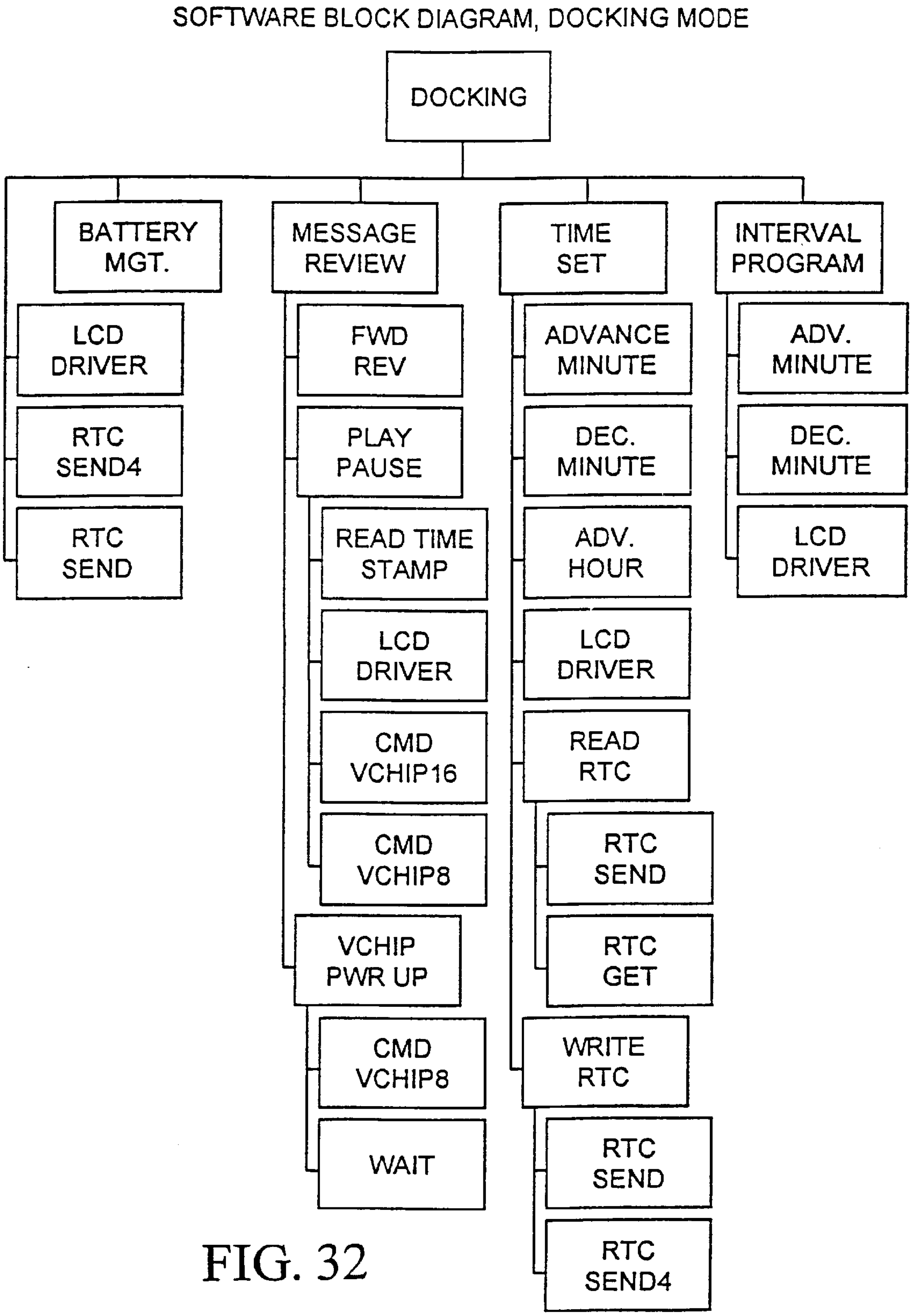
Figure 33:
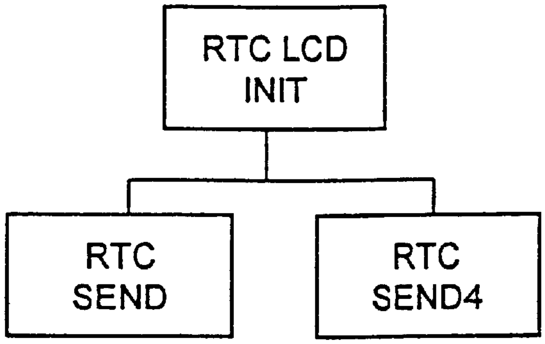

As shown more clearly in FIGS. 27 and 29, the bottom of the PCB 73 carries an audio amplifier 83, an LCD driver 84 a volume control 85 an audio output jack 101, and a battery holder 102. The volume control 85 extends through a notch 86 formed in a side wall of the housing base 66 (FIG. 26). Similarly, the audio output jack 101 extends through a semicircular notch 87 formed in a side wall of housing 55 (FIG. 27). FIGS. 30–33 show the block diagram of the software of the remote recording unit.

The major electrical functions associated with the present invention are shown in the block represented by one or more regions within the succeeding schematic drawings of FIGS. 36–43. Regions of the schematic drawings associated with a particular block on the block diagram are labeled accordingly. Thus the block diagrams of FIGS. 34–35 provide an overview of the electrical operation of the present invention, while the labeled schematic sub-sections (FIGS. 34–43) show the detailed electrical designs corresponding, respectively, to each block in the block diagram.

Figure 34:
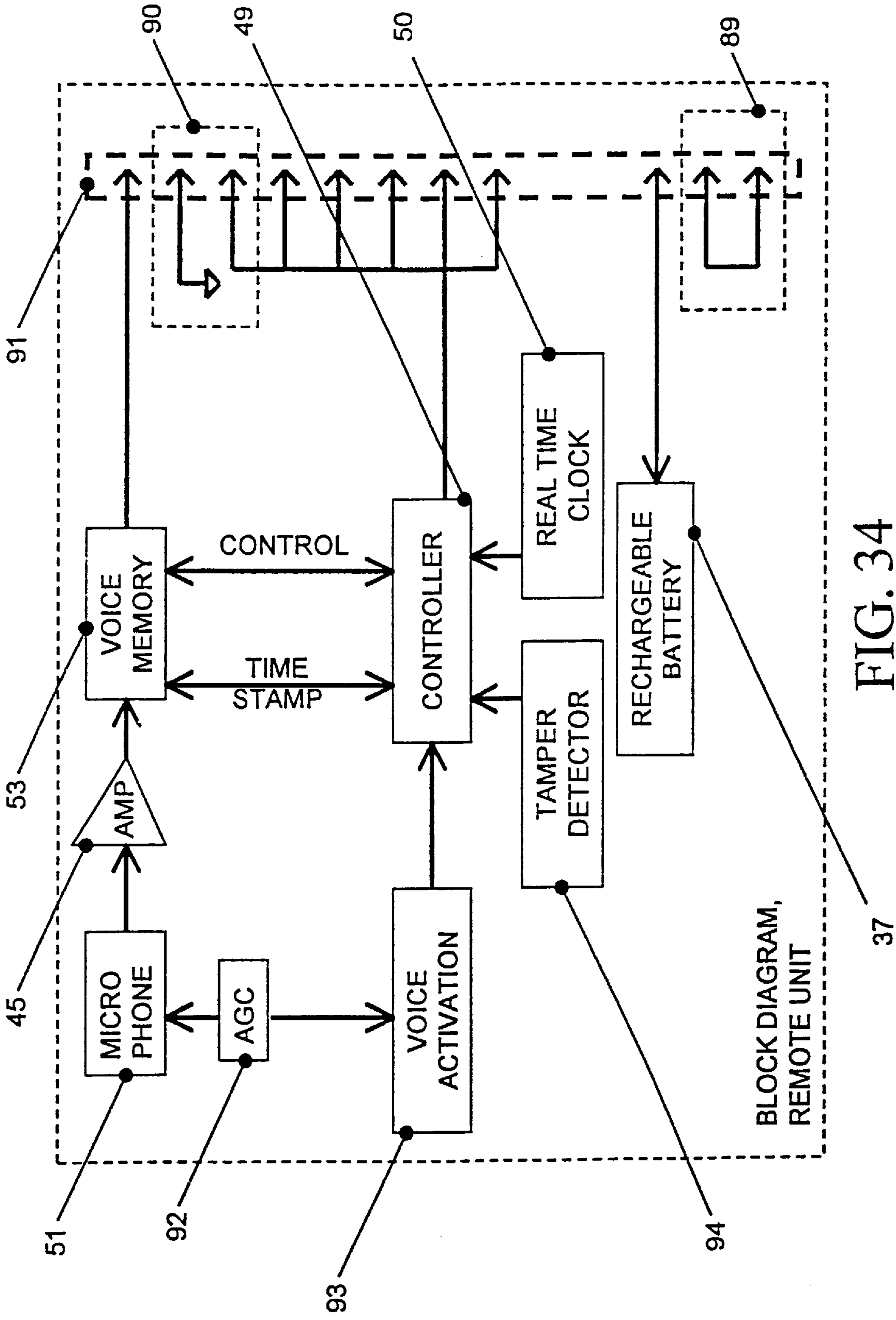
FIG. 34 is a schematic block diagram of a portion of the electrical circuitry of the apparatus of the present invention, showing the remote unit.
Figure 35:
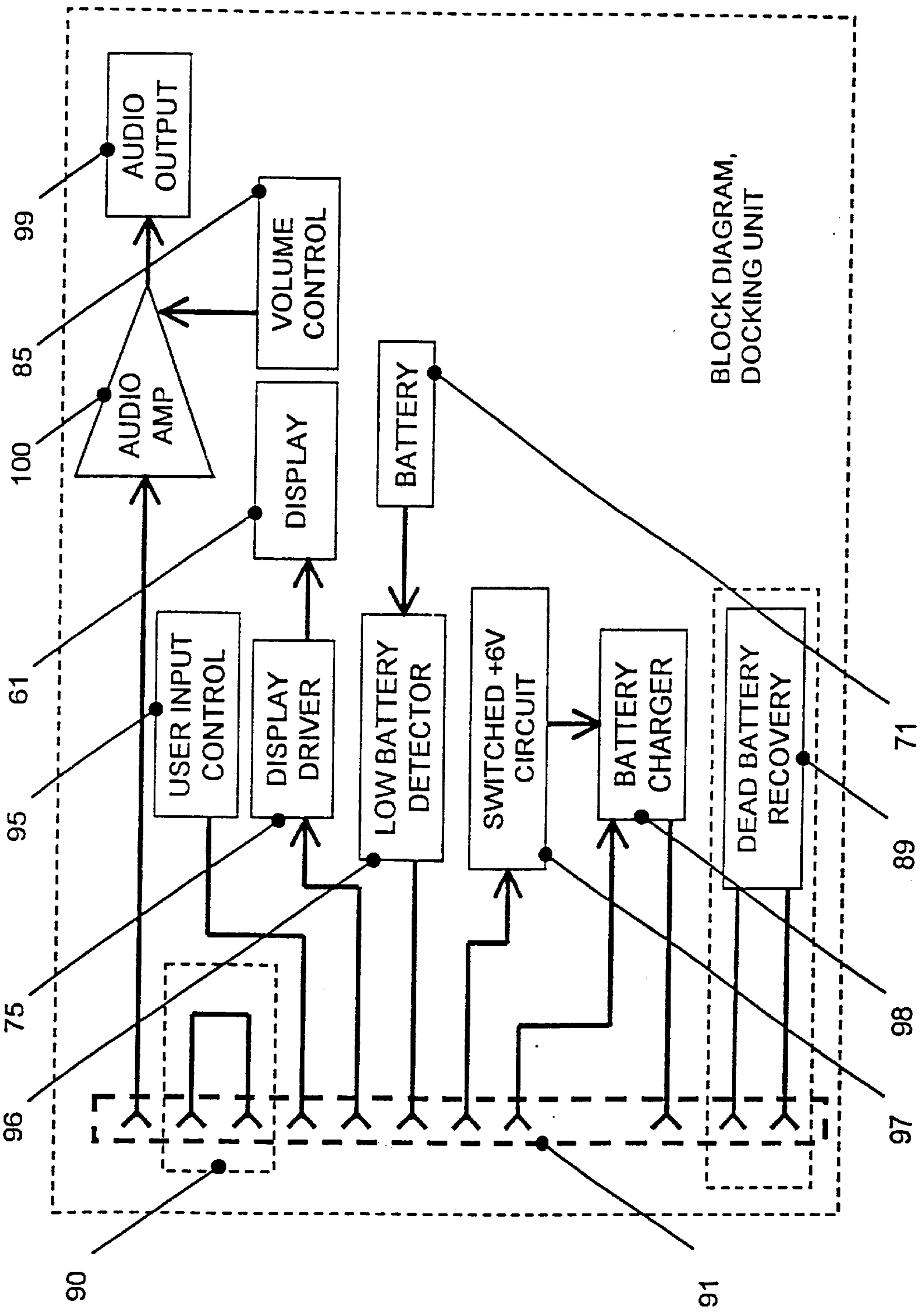
FIG. 35 is a schematic block diagram of a portion of the electrical circuitry of the apparatus of the present invention showing the docking unit.

In FIGS. 34 and 35, reference numeral 91 represents a docking connector interface. This docking connector interface 91 is represented schematically in FIGS. 36 and 37 using the circuit symbols P1 and P2, respectively. Referring to FIGS. 34 and 35, the outgoing and incoming arrow heads directly adjacent to both sides of the docking connector interface 91 represent non-permanent electrical connections. These docking connections are made at times when the remote recording unit 10 is docked and are broken at times when the remote recording unit 10 is undocked. While in docking mode, the docking connector interface 91 serves as the communications channel between the controller 49 and the electronic components housed inside of the docking unit 11. At times when the remote recording unit 10 is undocked, the docking unit 11 is left substantially inoperable because the link to the controller 49 is broken. The remote recording unit 10, however, remains independently operational even when the link to the docking unit 11 is broken. In addition to providing a communications channel, the docking connector interface 91 also provides the connections required so that the docking unit batteries 71 will be able to recharge the battery 37 in the remote recording unit 10.

ELECTRICAL DESCRIPTION OF BATTERY CHARGING

The battery 71 in the docking unit 11 has substantially more electrical power capacity than does the rechargeable battery 37 in the remote recording unit 10. While in the docking mode, the docking unit battery 71 provides the power required to automatically charge the remote recording unit battery 37 as well as the power required to operate all of the components in both the docking and remote recording units, 11 and 10, respectively. In a preferred embodiment, the docking unit battery 71 consists of four AA cells configured to yield a voltage of 6 Volts (when the cells are new).

Prior to operation, and with further reference to the block diagram of FIGS. 34 and 35, the battery 71 will have been installed into the docking unit 11 by a consumer, and the rechargeable battery 37 will have been installed into the remote recording unit 10 by the manufacturer. Upon connecting the remote recording unit 10 to the docking unit 11, a dead battery recovery circuit 89 (shown schematically in FIG. 40) automatically activates a battery charger 88 (see FIGS. 40 and 42). The automatic battery charging activation takes place when pins nineteen and twenty of the docking unit interface connector 54 are shorted by an electrically connected pair of pins on the remote recording unit interface connector 54. Initially, the battery charging rate is substantially higher than normal. Once the controller 49 is on line, it assumes control of the battery charging function and reduces the charging rate to a moderate level so that battery life will not be reduced. The controller 49 terminates battery charging after a programmed time duration corresponding to that recommended by the manufacturer of the rechargeable battery 37.

The battery charger 88 utilizes a switched +6 V ckt. 97 (shown on the block diagram of FIG. 34 and schematically in FIG. 42) to provide either high current or moderate current to the remote recording unit. High current is automatically activated by the dead battery recovery circuit 89 when the remote recording unit is first attached to the docking unit. Subsequently, the controller 49 terminates the high current output rate and initiates the moderate current output rate. The high current rate is used initially to speed up battery charging when and if the remote recording unit battery 37 is "dead." The moderate current rate is used later to reduce the battery charging rate to a level that will not degrade battery life.

After completing a number of charging cycles, the docking unit battery 71 will, itself, become substantially discharged. At this point its output voltage will be below a pre-defined threshold value, and a low battery detector 96 will respond by sending a "low battery" signal to the controller 49. Upon receiving this low battery signal, the controller 49 causes a low battery indicator to be displayed so that the user will know to replace the docking unit battery 71.

ELECTRICAL OPERATION DURING STAND-BY MODE

After the rechargeable battery 37 inside the remote recording unit 10 is fully charged, the remote recording unit 10 can operate independently from the docking unit 11. Once the remote recording unit 10 has been separated from the docking unit 11, but before it has been installed on a child (for example), the controller 49 within the remote recording unit 10 enters "stand-by mode." Stand-by mode consists of a continuously running loop in which the controller 49 monitors designated indicator signals to determine when the remote recording unit 10 is either reconnected to the docking unit 11 or else when it becomes connected to a child.

The signal monitored in order to detect reconnection of the remote recording unit 10 to the docking unit 11 is generated by a pair of docking indicator pins 90 (shown schematically in FIGS. 37–40). When reconnection occurs, the docking indicator pins 90 provide a ground path for an otherwise open circuit signal line. The presence of the ground path causes current to flow in the docking indicator lines thus changing the state of a docking indicator signal from a logical "1" to a logical "0." Upon detecting a logical "0" signal on the docking indicator line, the controller 49 transitions from stand-by mode into docking mode.

Figure 36:
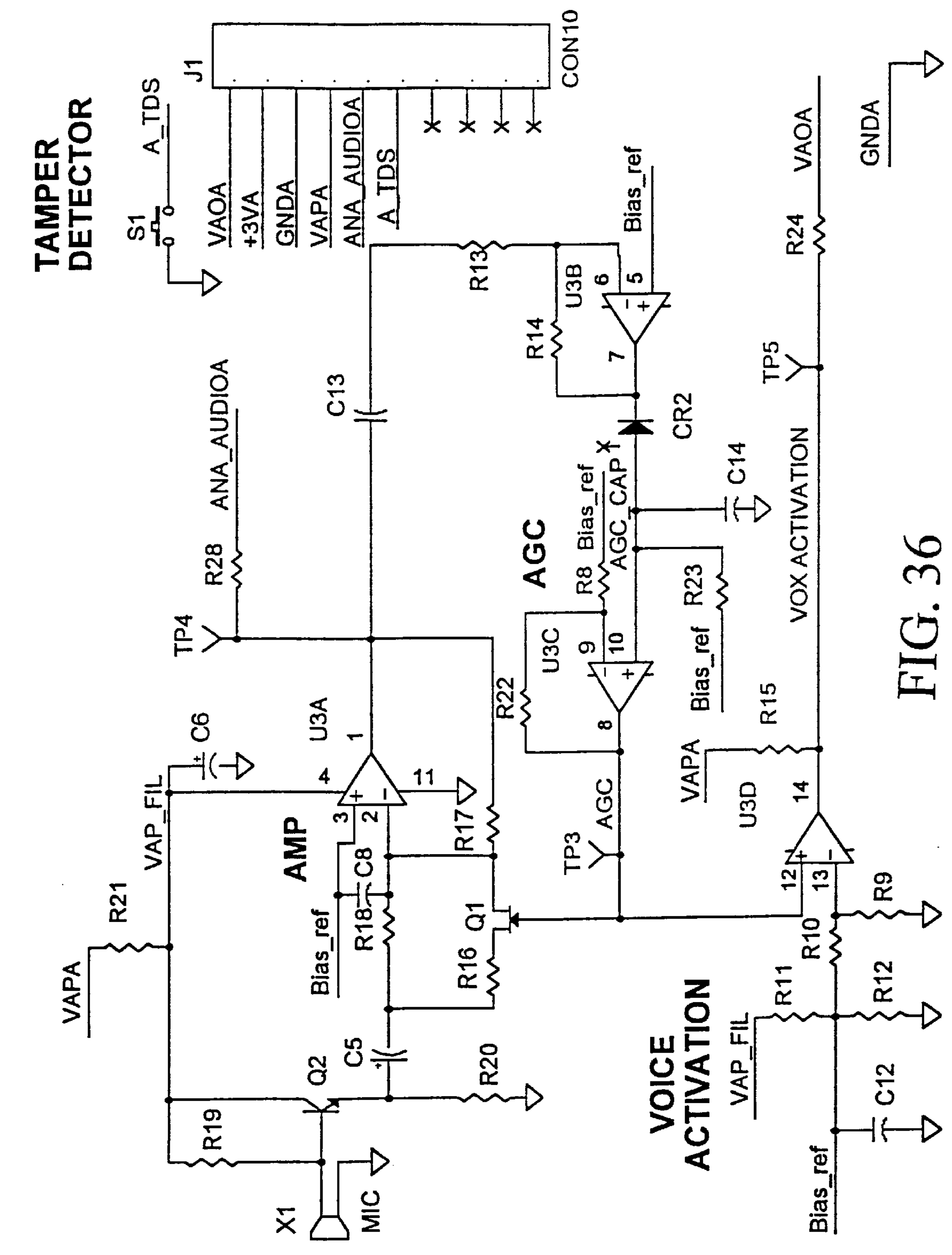
FIG. 36 is a schematic circuit diagram of the analog circuitry in the remote recording unit.
Figure 37:
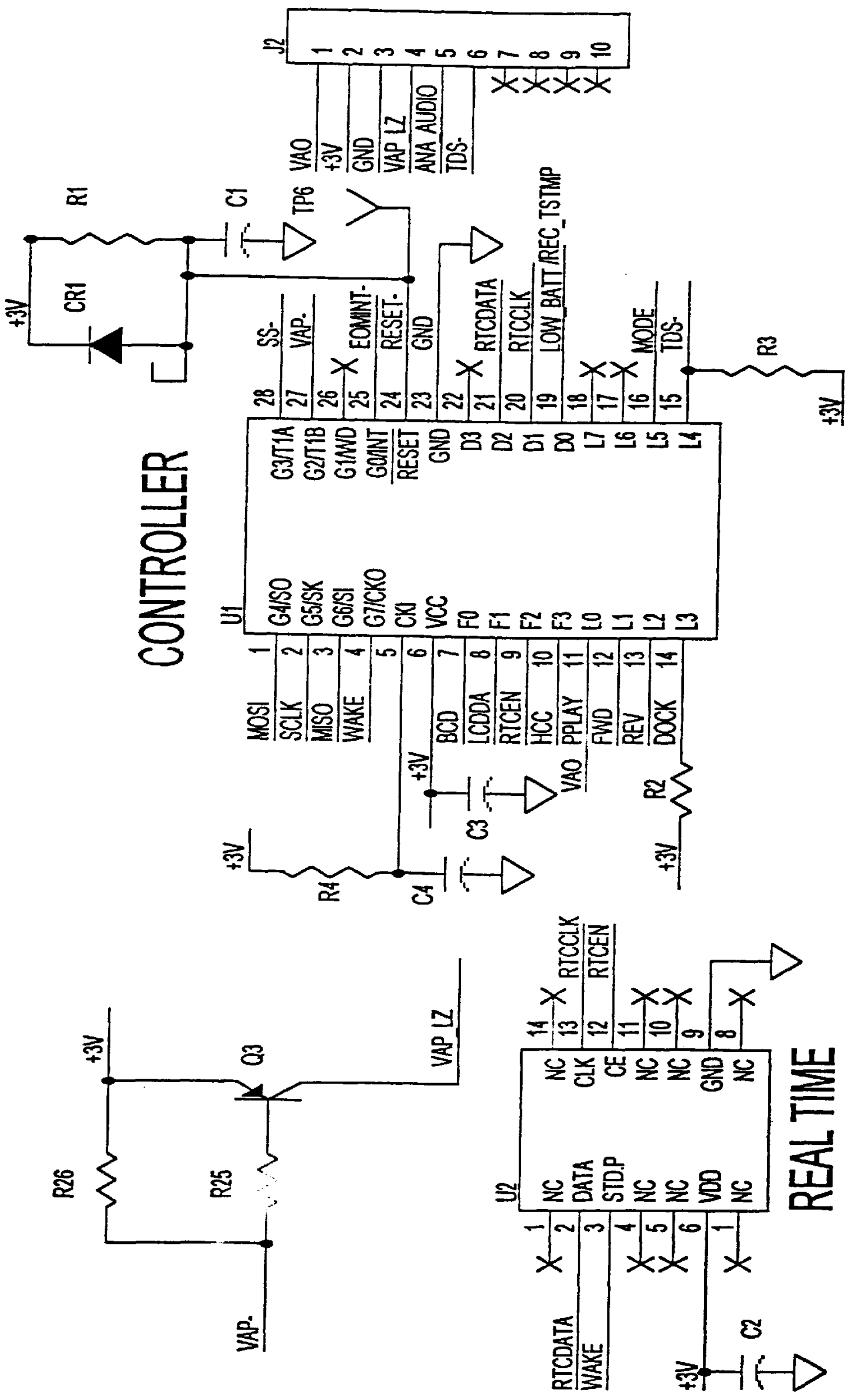
FIG. 37 is an overall wiring diagram of the digital circuitry in the controller of the remote recording unit of the present invention.
Figure 38:
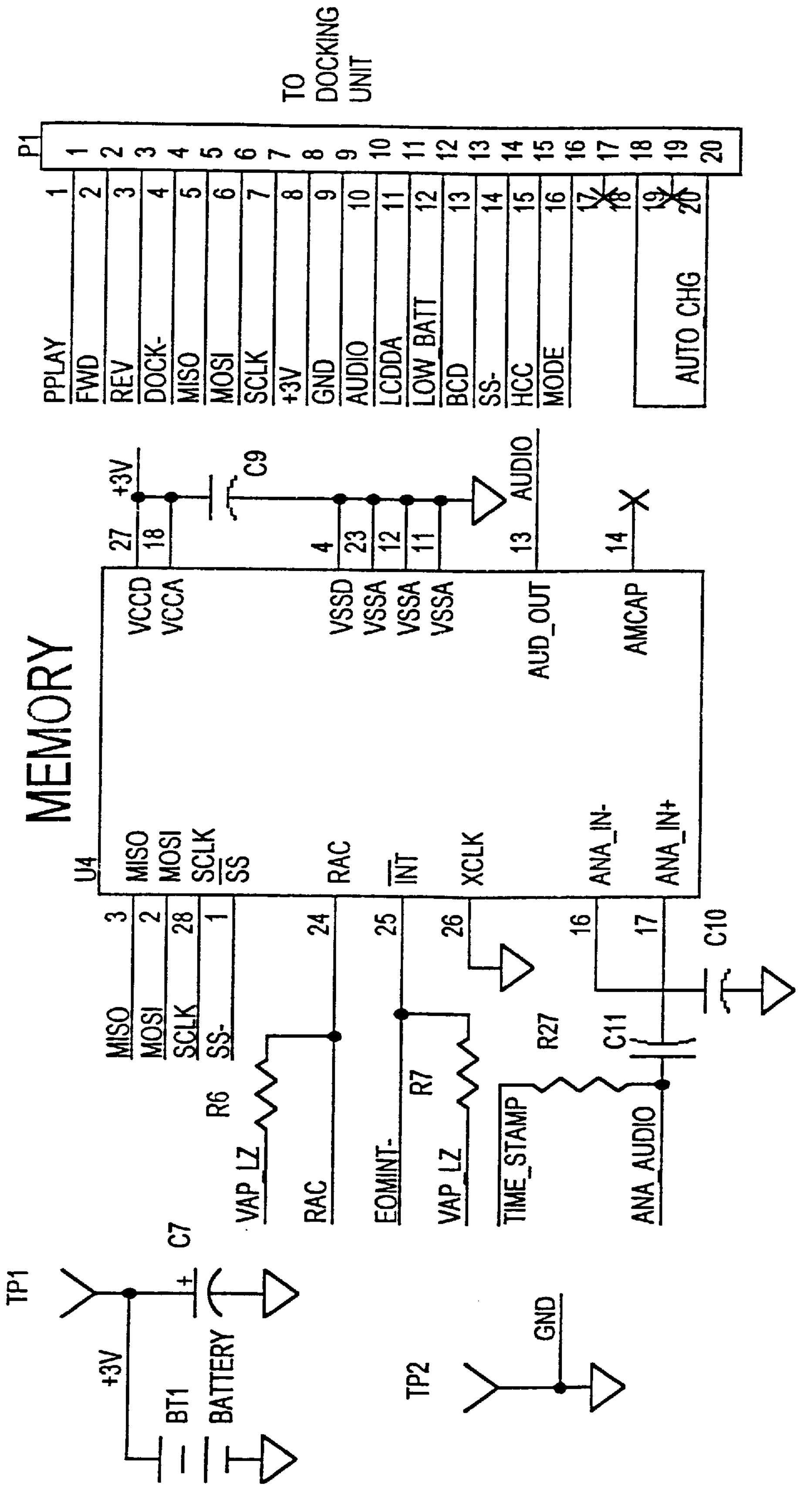
FIG. 38 is an overall wiring diagram of the digital circuitry in the memory of the remote recording unit of the present invention.
Figure 39:
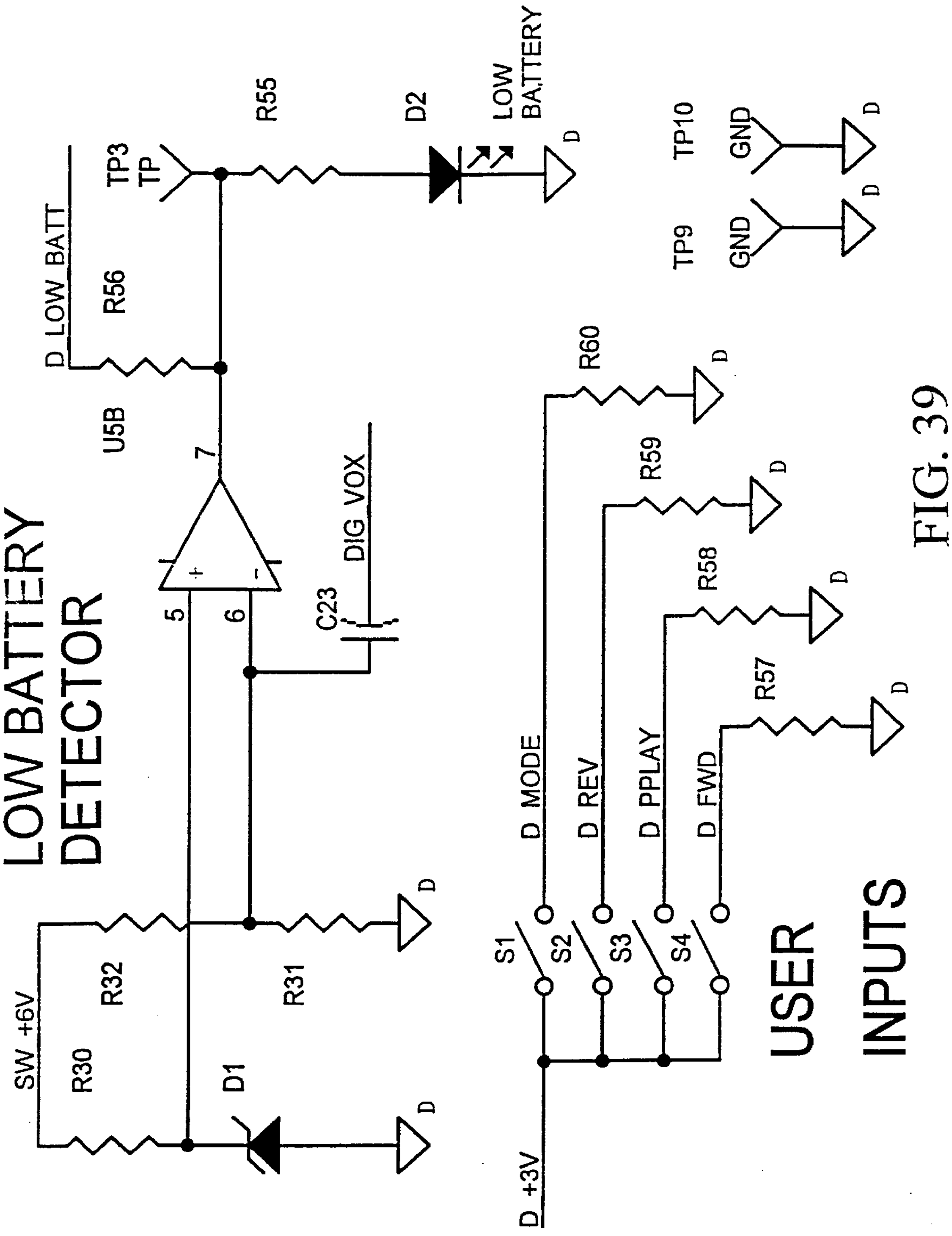
FIG. 39 is a wiring diagram of the low battery detector and user input portions of the docking unit of the present invention.
Figure 40:
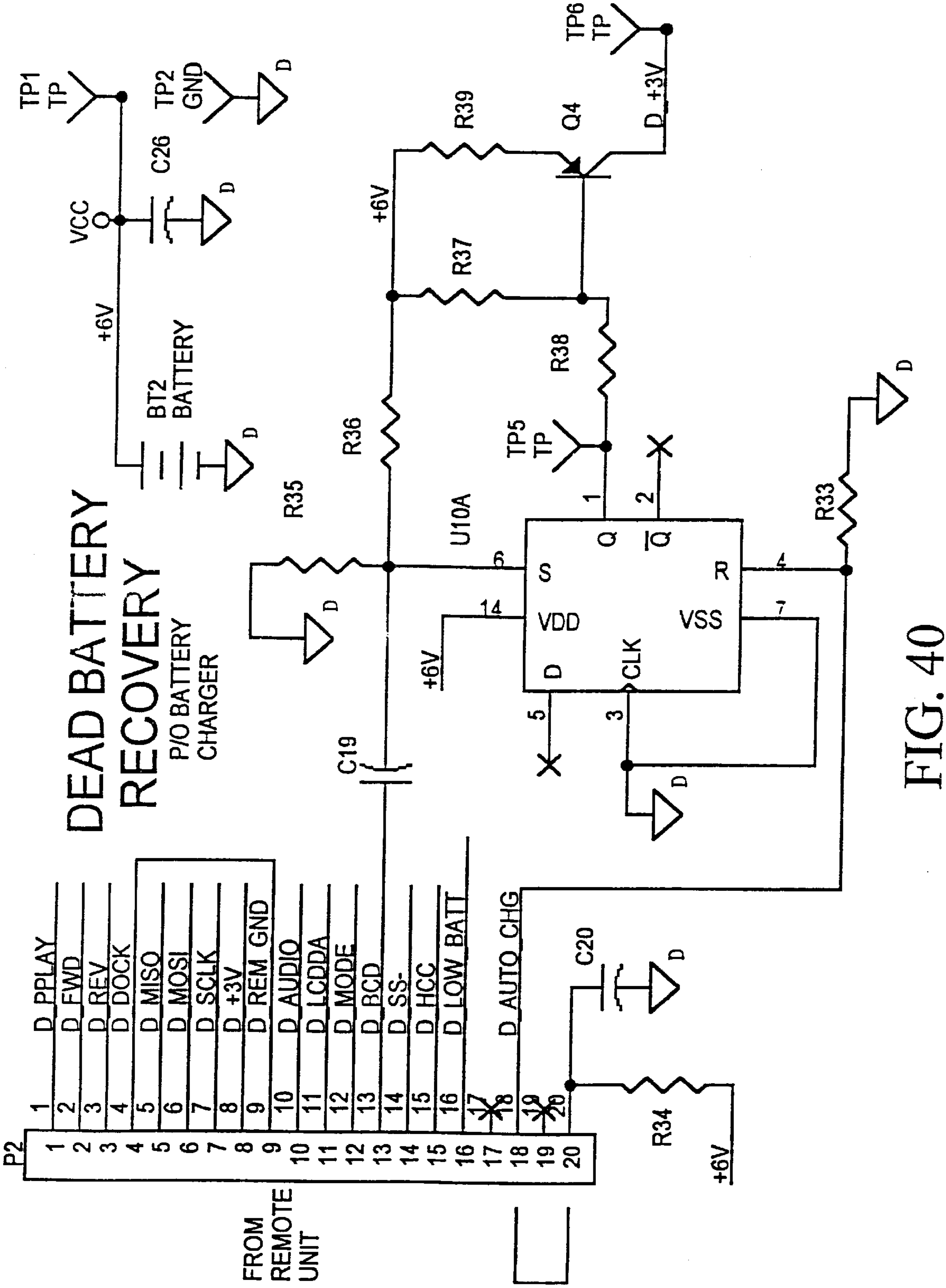
FIG. 40 is a wiring diagram of the dead battery recovery portion of the docking unit of the present invention.
Figure 41:
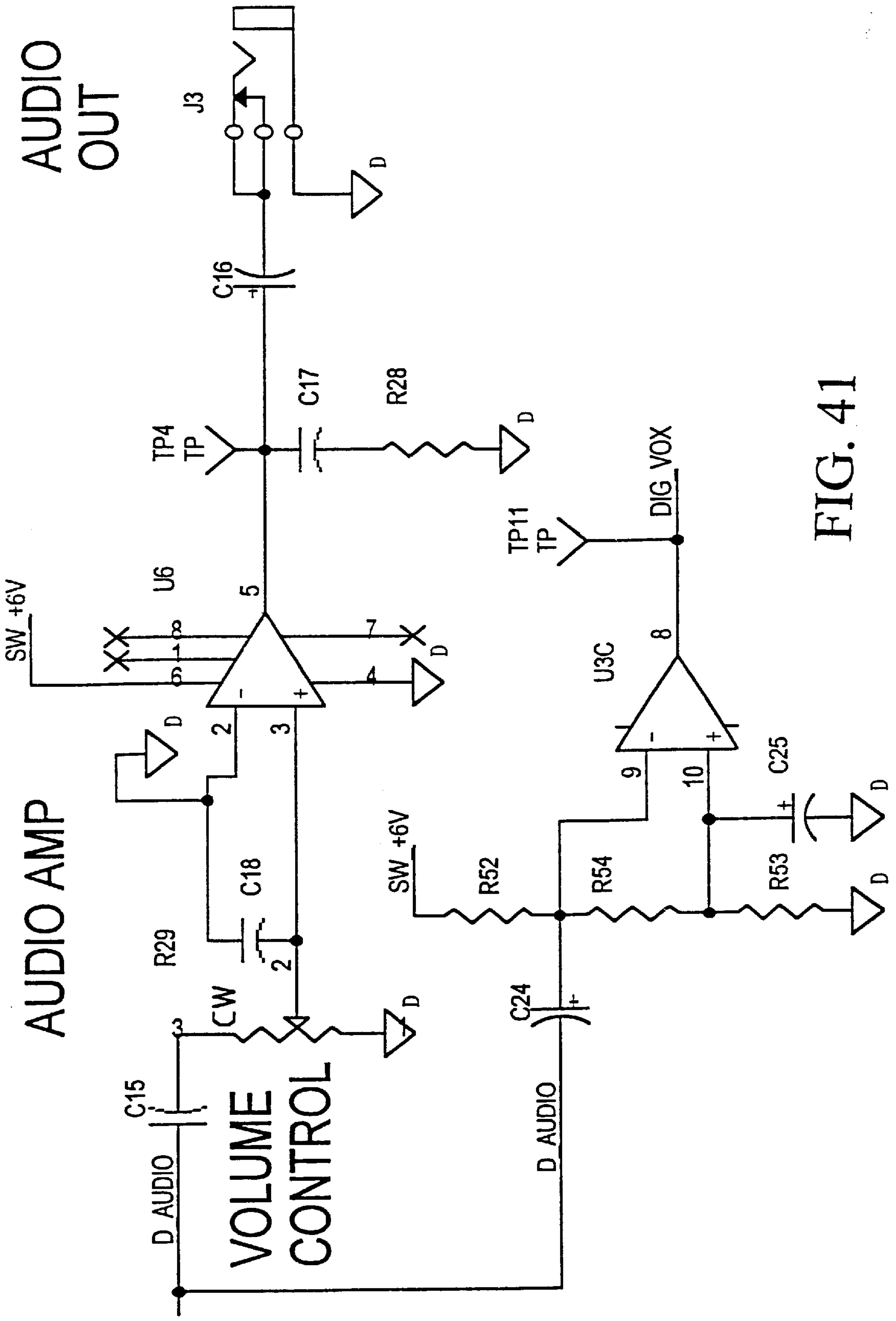
FIG. 41 is a wiring diagram of the audio amp and audio out portions of the docking unit of the present invention.
Figure 42:
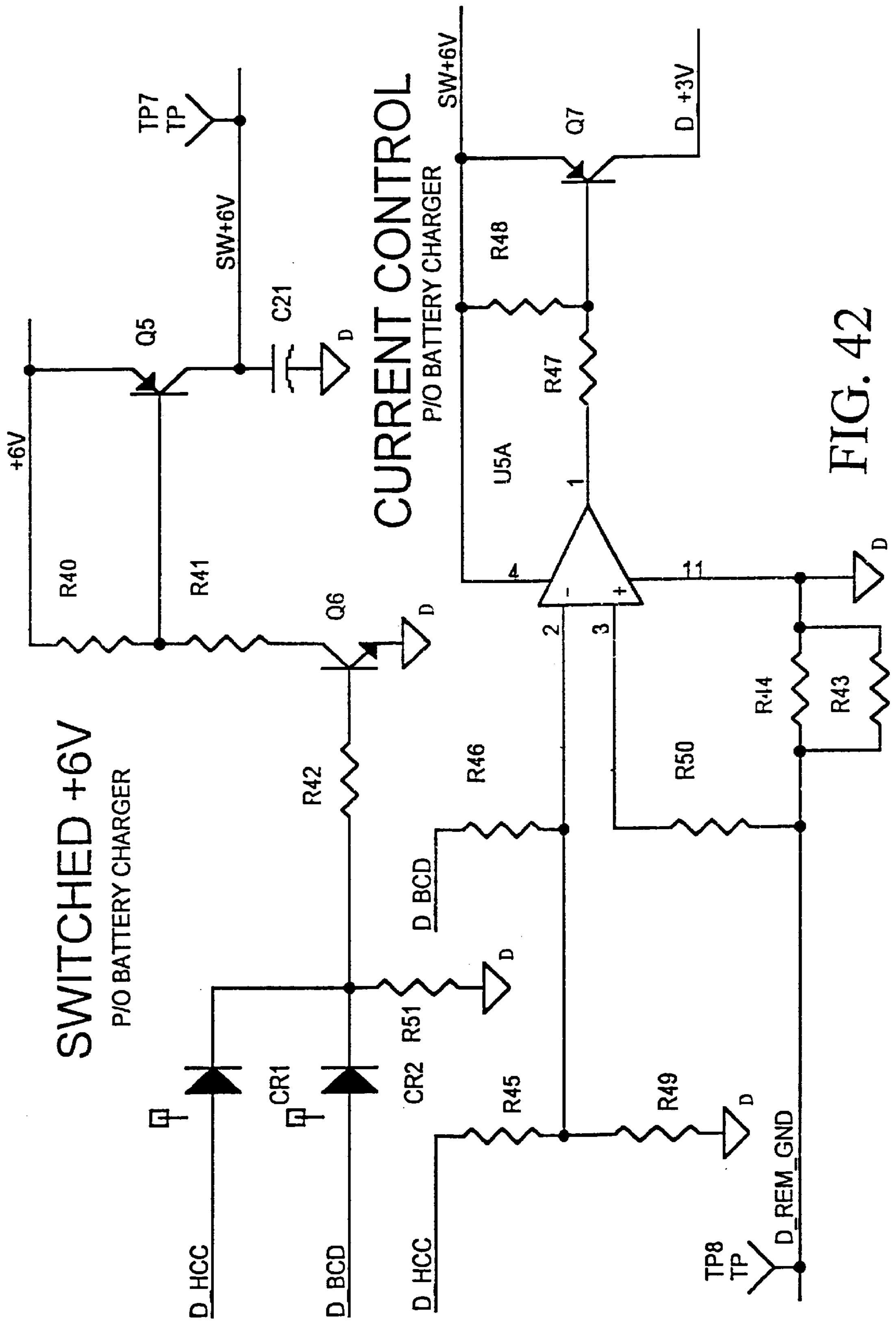
FIG. 42 is a schematic circuit diagram of the battery charging circuitry within the docking unit.
Figure 43:
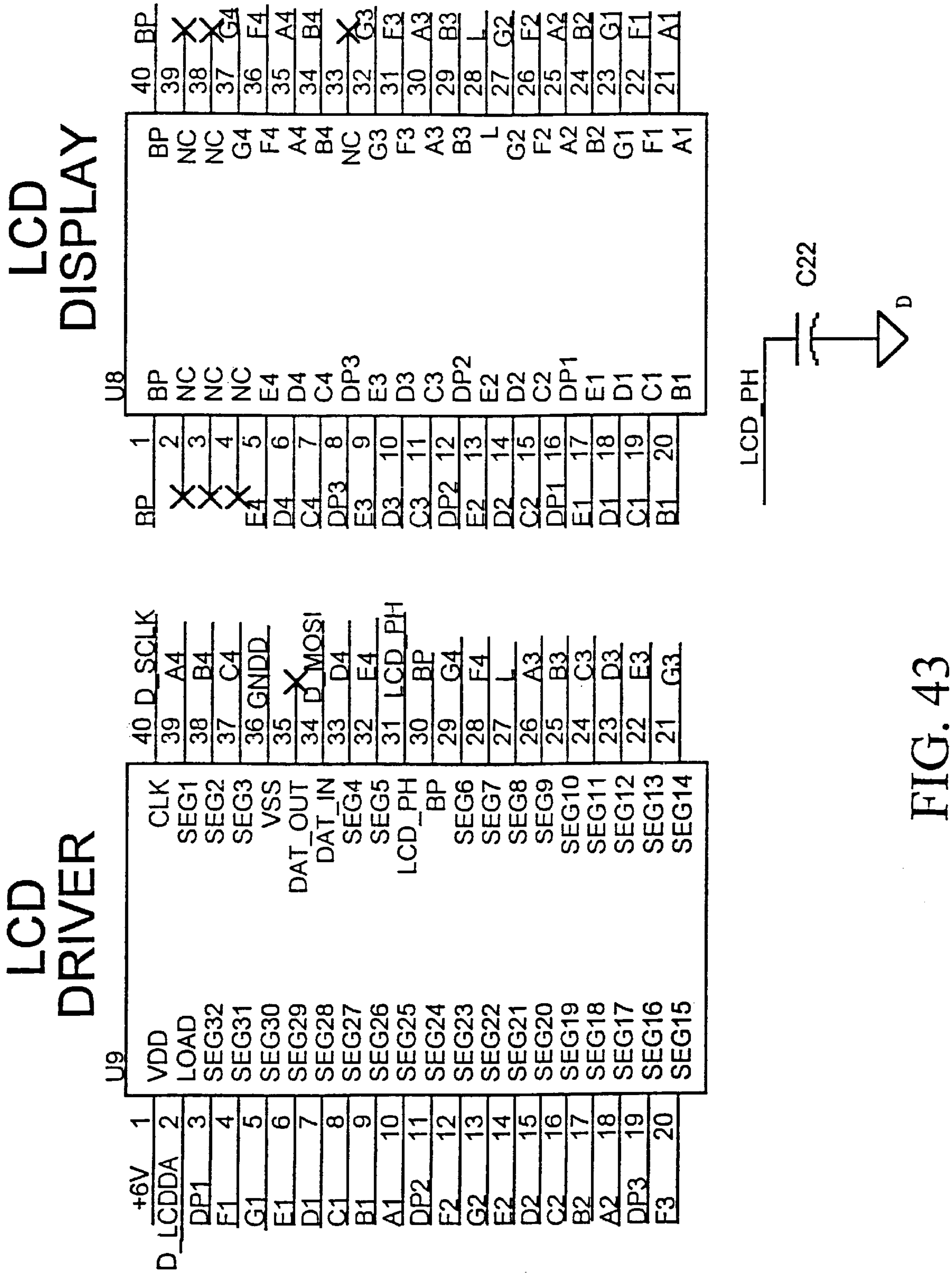
FIG. 43 is a wiring diagram of the LCD and LCD driver within the docking unit.

Also while in stand-by mode, the controller 49 monitors the output of a tamper detector 94 (shown schematically in FIG. 36). The tamper detector 94 corresponds to a latching mechanism used to attach the remote recording unit to a child. The tamper detector output remains at a logical "0" state until the remote recording unit is attached to a child. As soon as the remote recording unit is attached to a child, the tamper detector output transitions to a logical "1" state causing the controller 49 to transition from stand-by mode into remote mode.

OVERVIEW OF ELECTRICAL OPERATION WHILE IN REMOTE MODE

Upon entering remote mode, the controller 49 reads the current time of day from a real time clock 50 and stores this time of day in a designated location within a voice memory 53. Following this, the controller 49 programs the real time clock 50 to generate a periodic wake up signal once every minute. The controller 49 then powers down all unneeded electrical components inside the remote recording unit and enters a low current state referred to as "sleep mode." At periodic intervals, the real time clock 50 sends a wakes up signal to the controller 49. After being woken up, the controller 49 determines whether or not the amount of elapsed time spent in sleep mode corresponds to a user specified time interval. If the specified time interval has not passed, the controller 49 re-enters sleep mode. If, however, the time in sleep mode is equal to or greater than the user specified interval the controller 49 enters "sound monitoring mode." While in sound monitoring mode, the controller 49 monitors the surroundings for sound during a one minute time period. If sounds are present, the controller 49 initiates "record mode" so that the sounds will be recorded. If, during the one minute time window, no sound is detected, the controller 49 returns to sleep mode. This basic operating cycle consisting of sleep mode, sound monitoring mode, and record mode continues until the rechargeable battery 37 is fully discharged, or until the remote recording unit is removed from the child, which ever comes first.

ELECTRICAL OPERATION WHILE IN SOUND MONITORING MODE

When sound monitoring mode is initiated, the controller 49 applies power to a microphone 51, an amplifier 45, an automatic gain control circuit (AGC) 92, and a voice activation circuit 93 (all shown in the block diagram of FIG. 35). After power is applied to these circuits (shown schematically in FIGS. 31–32), sounds entering the microphone 51 are transduced into electrical signals and then fed to the amplifier 45. The amplifier 45 amplifies the electrical signals and then feeds these signals into the AGC 92. From within the AGC block 92, a signal proportional to the peak signal level at the AGC input is captured and fed to a voice activation block 93. Within the voice activation block 93, the signal from the AGC block 92 is converted into a binary signal. This binary signal has either a logical "1" state if the signal from the AGC 92 is sufficiently strong, or else a logical "0" state in all other cases. A logical "1" state at the output of the voice activation block 93 indicates that sound (or voice) is present at the microphone input Likewise, a logical "0" state at the output of the voice activation block 93 indicates either that no sound is present, or that an insufficiently loud sound is present.

While still in sound monitoring mode, and upon receiving a logical "1" signal from the voice activation block 93, the controller 49 initiates record mode. In the absense of a logical "1" signal from the voice activation block 93 for a continuous one minute time period, the controller 49 returns to sleep mode.

ELECTRICAL OPERATION WHILE IN RECORD MODE

Assuming that sound is detected during sound monitoring mode, a logical "1" signal, generated by the voice activation circuit 93, will cause the controller 49 to initiate "record mode." While in record mode the controller 49 performs the following tasks: (1) the time of day is read from the real time clock 50, (2) the time of day is "written to," or stored in, voice memory 53 as a "time stamp," and (3) sound information is recorded into voice memory 53 for a time period of 10 to 20 seconds. While sounds are being recorded, the AGC 92 increases the dynamic range of the remote recording unit by causing the amplifier 45 to amplify weak signals more than strong signals. Thus, the AGC circuit 92 helps maintain a relatively narrow range of power levels at the output of amplifier 45. This permits normal room sounds with a relatively wide amplitude range to be compressed into a substantially more narrow amplitude range. This amplitude compression permits the voice memory 53 to record relatively loud sounds without substantially reducing its ability to also record relatively quiet sounds.

ELECTRICAL OPERATION OF THE TAMPER DETECTOR

In parallel with the tasks described above, and while still in remote mode, the controller 49 continuously monitors a binary output signal generated by the tamper detector 94. As mentioned earlier, the tamper detector 94 continuously outputs one of two possible states corresponding to either a logical "1" or a logical "0." While the remote recording unit 10 remains attached to a child the corresponding output from the tamper detector 94 will be a logical "1." When the remote recording unit 10 is removed from a child, the tamper detector output will transition to a logical "0," and the controller 49 will set a flag indicating that the remote recording unit 10 has been removed Once the controller 49 senses that the remote recording unit 10 has been removed from a child, the controller 49 writes the current time of day into voice memory 53 to mark the time of device removal. Immediately following this, the controller 49 synthesizes a warning beep waveform and stores the waveform in voice memory 53. Once the beep waveform is stored, the controller 49 initiates record mode so that sounds occurring at the time of device removal will be recorded Following record mode, the controller 49 concludes the tamper detection processing by returning to stand-by mode (discussed previously).

OVERVIEW OF ELECTRICAL OPERATION WHILE IN DOCKING MODE

After the remote recording unit 10 has been removed from a child, and re-connected to the docking unit 11, the battery charger 98 automatically begins charging the battery 37 in the remote recording unit 10. The initial charging is performed at a "high current" rate as discussed previously. If the remote recording unit battery 37 is not fully discharged when the two units are connected, then the controller 49 will be operational at the moment the two units are connected. In this case, the controller 49 will immediately terminate "high current" battery charging and will initiate "moderate current" battery charging. If however, the remote recording unit battery 37 is fully discharged, the controller 49 will be off line momentarily while battery charging takes place. Once the remote recording unit battery 37 is sufficiently recharged, the controller 49 comes on line. At this point, the docking indicator pins 90 let the controller 49 know that the remote recording unit 10 is connected to the docking unit 11 (as described previously in greater detail).

Once the controller 49 is on line, it begins monitoring a set of user input controls 95 shown on the block diagram of FIG. 26. The user input controls 95 represent four push buttons on the docking unit 11 which actuate four electrical switches shown schematically in FIG. 39. Each of these switches generates an independent binary signal level in response to a user pressing one of the four push buttons. That is, when a push button is pressed, the switch corresponding to that push button closes and generates a binary signal equivalent to a logical "1." This binary signal is then received and processed by the controller 49. At other times when no push button is pressed, all switches remain open, and a binary signal corresponding to a logical "0" is generated by each switch and received by the controller 49 on four independent input lines. Thus, at any given time when, for example, the play/pause button 62 is not actuated, a corresponding switch S3 (shown schematically in FIG. 39) will remain open. While open, S3 generates a signal corresponding to a logical "0" which is detected by the controller 49. The controller 49 takes no special action in response to this logical "0" signal. However, when a user presses the play/pause button 62, switch S3 will close generating a logical "1" signal. Upon detecting this logical "1" signal, the controller 49 will respond by carrying out a function commensurate with the current operating mode. The remaining push buttons comprising the user input control 95 function in the same manner as the play/pause push button referred to in this example.

One of the user input controls 95 is a mode select button 65. Upon receiving a logical "1" signal from the mode select switch, the controller 49 redefines the functions carried out by the remaining push buttons. Redefining the push button functions corresponds to initiating a different operating mode subordinate to docking mode. The three operating modes subordinate to docking mode are: 1) Message review mode, 2) Time setting mode, and 3) Interval programming mode. Message review mode is the default mode when the remote recording unit 10 is first connected to the docking unit 11. Subsequently, the operating mode cycles from one mode to the next in a looping fashion each time the mode select button 65 is pressed.

ELECTRICAL OPERATION DURING MESSAGE REVIEW MODE

While in message review mode, a user requests message playback by pressing the play/pause button 62. The controller 49 responds to this action by sending a PLAY command to the voice memory 53. In response to this, the voice memory 53 outputs a time stamp (stored previously while the remote recording unit 10 was attached to a child) which is received by the controller 49. Following this, the voice memory 53 outputs stored sounds that were recorded at a time corresponding to the time stamp. Referring to the block diagram of FIGS. 34–35, the stored sounds are fed from voice memory 53 to an audio amp 100. The audio amp 100 amplifies the sounds and sends them to an audio output 99. In the preferred embodiment, the audio output 99 is a phono-jack 101 which can accommodate a pair of head phones (not shown) or a conventional speaker (not shown). Also in the preferred embodiment, a volume control 85 is provided so that when the user rotates a thumb wheel mounted on the volume control 85, the gain of the audio amp 100 will be adjusted and the output sound volume will change accordingly.

As the sounds are being played, the time stamp associated with the sounds is presented on the display 61. The process of displaying information on the display 61 begins at the controller 49. Serial data representing the information to be displayed is outputted from controller 49 to a commercially available display driver 84. The display driver 84 converts the serial data from the controller 49 into parallel waveforms. The parallel waveforms are then outputted to the display 61 when a designated signal line routed from the controller 49 to the display driver 84 is set to a logical "1" state by the controller 49.

Immediately after initiating message playback, the controller 49 requests additional supply current by sending a signal level corresponding to a logical "1" to the switched +6V circuit 97. Upon receiving this signal from the controller 49, the switched +6V circuit 97 delivers an additional 30 mA worth of supply current to voice memory 53 while a message is playing. When message playback is terminated, the controller 49 deactivates the additional supply current by sending a signal corresponding to a logical "0" state to the switched +6V circuit 97.

ELECTRICAL OPERATION DURING TIME SETTING MODE

The real time clock 50 is set when time setting commands from the user input control 95 are sent to the controller 49. The controller 49 translates the time setting commands into actual time values. The controller 49 then writes the time values into a designated register within the real time clock 50.

ELECTRICAL OPERATION DURING INTERVAL PROGRAMMING MODE

The electrical operation while in interval programming mode corresponds substantially to that of time setting mode. The primary difference is that a time interval between recording sessions is stored in a register within the controller 49 as opposed to the time of day being stored in a register within the real time clock 50.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. An apparatus for monitoring background sounds when a child, patient or pet is left in the temporary care of a third person or persons, comprising a remote recording unit worn by or otherwise attached to the child, patient or pet and being substantially "childproof", such that the remote recording unit cannot normally be removed by the child, patient or pet, the remote recording unit monitoring the environment for sounds, determining if sounds are present, and recording any background sound bytes at respective times and for given intervals during the time the child, patient or pet is left in the temporary care of the third person or persons, tamper detection means in the remote recording unit and generating an internal "flag" indicating that the remote recording unit was improperly removed by an unauthorized person or persons, means enabling the parent, guardian or pet owner to remove the remote recording unit from the child, patient or pet, and means for playing back the recorded sound bytes, thereby determining whether the child, patient or pet was abused, mistreated or subjected to an undesirable environment while in the care of the third person or persons.

2. The apparatus of claim 1, wherein the means for playing back the recorded sound bytes comprises a docking unit receiving the remote recording unit.

3. The apparatus of claim 2, wherein the docking unit displays the time of the day when each sound byte was recorded.

4. The apparatus of claim 2, wherein the docking unit displays the time of the day when the remote recording unit was last "armed".

5. The apparatus of claim 2, wherein the remote recording unit is powered by a rechargeable battery.

6. The apparatus of claim 2, wherein the rechargeable battery in the remote recording unit automatically recharges when the remote recording unit is connected to the docking unit.

7. The apparatus of claim 2, wherein the docking unit is provided with "fast forward", "reverse", "skip" and "pause" features, respectively.

8. The apparatus of claim 2, wherein the docking unit has a plurality of connector pins, and wherein the remote recording unit has a corresponding plurality of connector sleeves receiving the connector pins, respectively, on the docking unit.

9. The apparatus of claim 2, wherein the remote recording unit includes a microphone, and wherein the docking unit includes a speaker for broadcasting the respective sound bytes.

10. An apparatus for monitoring background sounds when a child, patient or pet is left in the temporary care of a third person or persons, comprising a remote recording unit worn by or otherwise attached to the child, patient or pet and being substantially "childproof", such that the remote recording unit cannot normally be removed by the child, patient or pet, the remote recording unit including a microphone for monitoring and recording background sound bytes at respective times and for given intervals during the time the child, patient or pet is left in the temporary care of the third person or persons, tamper detection means in the remote recording unit and generating an internal "flag" indicating that the remote recording unit was improperly removed by an unauthorized person or persons, means enabling the parent, guardian or pet owner to remove the remote recording unit from the child, patient or pet, and a docking unit for receiving the remote recording unit, the docking unit including a speaker for playing back the recorded sound bytes, thereby determining whether the child, patient or pet was, mistreated or subjected to an undesirable environment while in the care of the third person or persons, the docking unit displaying the time of the day when each sound byte was recorded, and the docking unit being provided with "fast forward", "reverse", "skip" and "pause" features, respectively, wherein the docking unit has a plurality of connector pins, and wherein the remote recording unit has a corresponding plurality of connector sleeves receiving the connector pins, respectively, on the docking unit.

11. The apparatus of claim 10, wherein the remote recording unit includes a housing having a slot formed therein, and wherein a wrist strap is received through the slot in the housing to removably mount the remote recording unit on a child, parent or pet.

12. The apparatus of claim 11, wherein the wrist strap includes a plurality of spaced-apart holes and further includes a buckle received in one of the holes for removably mounting the remote recording unit.

13. The apparatus of claim 10, wherein the tamper detection means comprises a swivel post rotatably journaled within the housing, the swivel post having alternate axial positions including an "armed" position and a "disarmed" position, resilient means constantly urging the swivel post towards its "armed" position, the swivel post having a bottom portion extending into the slot in the housing and received in one of the holes in the wrist strap when the swivel post is in its "armed" position, thereby preventing the unauthorized removal of the wrist strap from the child, patient or pet, the swivel post further having an enlarged cap portion provided with a partial circumferential shoulder extending radially thereof, the housing having a wall provided with a ledge receiving the shoulder on the swivel post and preventing movement of the swivel post from its "armed" position into its "disarmed" position, wherein the swivel post may be rotated through an angle to release the shoulder on the cap on the swivel post from the ledge in the housing, and such that thereafter the swivel post may be manually raised from the "armed" position into the "disarmed" position thereof against the force of the resilient means, and circuit means within the housing and responsive to movement of the swivel post from its "armed" to its "disarmed" position to generate an internal "flag" indicating tampering of the swivel post and/or an unauthorized removal of the wrist strap.

14. The apparatus of claim 13, wherein the circuit means is powered by a battery within the housing, and wherein the "disarmed" position of the swivel post comprises an open-circuit condition of the circuit means, thereby substantially reducing the drain on the battery and substantially extending its discharge cycle.

15. The apparatus of claim 14, wherein the battery is rechargeable, and wherein the battery is recharged when the recording unit is received on the docking unit.

16. The apparatus of claim 13, wherein the swivel post has an intermediate portion, wherein a collar is carried by the intermediate portion of the swivel post, and wherein the resilient means comprises a first compression spring piloted on the swivel post and disposed between the collar on the swivel post and the top wall of the housing.

17. The apparatus of claim 13, wherein the circuit means includes a printed circuit board within the housing and disposed beneath the top wall of the housing, the printed circuit board having an opening through which the coil spring is received.

18. The apparatus of claim 17, wherein the printed circuit board has a lower face provided with spaced-apart contacts, and wherein a second compression spring comprising a switch contact spring is disposed radially of the first compression spring, the switch contact spring being spaced from the contacts on the printed circuit board axially of the swivel post in the "armed" position thereof, such that when the swivel post is manually raised form the "armed" position into the "disarmed" position thereof, the switch contact spring bridges the spaced-apart contacts on the printed circuit board to generate the internal "flag" indicative of tampering with the swivel post or unauthorized removal of the wrist strap.

19. The apparatus of claim 16, wherein the collar on the swivel post is provided with a radially-projecting annular ledge, and wherein the switch contact spring is supported on the annular ledge on the collar.

20. An apparatus for monitoring background sounds when a child, patient or pet is left in the temporary care of a third person or persons, comprising a remote recording unit including a wrist strap attached to the child and being substantially "childproof", such that the remote recording unit cannot normally be removed by the child, the recording unit monitoring and recording background sounds during the time the child is left in the temporary care of the third person or persons, tamper detection means in the remote recording unit and cooperating with the wrist strap to generate an internal "flag" indicating that the remote recording unit was improperly removed by an unauthorized person or persons, wherein the remote recording unit may be removed from the child, and wherein the sounds recorded by the remote recording unit may be played back, thereby determining whether the child was abused, mistreated or subjected to an undesirable environment while in the care of the third person or persons.

21. The apparatus of claim 20, wherein the background sounds comprises sound bytes.

22. The apparatus of claim 21, wherein the sound bytes are random.

23. The apparatus of claim 21, wherein the sound bytes are programmable.

24. The apparatus of claim 21, further including a docking unit for playing back the sound bytes recorded by the remote recording unit.

25. An apparatus for monitoring background sounds when a child, patient or pet is left in the temporary care of a third person or persons, comprising a remote recording unit powered by a rechargeable battery and intended to be worn by or otherwise attached to the child, patient or pet, the remote recording unit including a microphone for monitoring and recording background sound bytes at respective times and for given intervals during the time the child, patient or pet is left in the temporary care of the third person or persons, and a docking unit including a speaker, such that the parent, guardian or pet owner may remove the remote recording unit from the child, patient or pet, and thereafter plug the remote recording unit into the docking unit, thereby playing back the recorded sound bytes, and thereby determining whether the child, patient or pet was abused, mistreated or subjected to an undesirable environment while in the care of the third person or persons, and wherein the rechargeable battery is recharged while the remote recording unit is plugged into the docking unit.

26. The apparatus of claim 25, wherein the remote recording unit is substantially "childproof" and cannot normally be removed by the child, patient or pet, and wherein an internal "flag" is generated in the remote recording unit whenever the remote recording unit is improperly removed by an unauthorized person or persons.

27. The apparatus of claim 26, wherein the internal "flag" is generated by a tamper detection means in the remote recording unit, the tamper detection means including a manually-manipulatable resiliently-biased swivel post.

28. The apparatus of claim 27, wherein a wrist strap is provided for attaching the remote recording unit to a child's wrist, the remote recording unit having a through slot receiving the wrist strap, wherein the wrist strap is provided with a plurality of spaced-apart holes, and wherein the swivel post extends through the slot in the remote recording unit and into one of the holes in the wrist strap.

29. The method of monitoring the background sounds when a child, patient or pet is left in the temporary care of a third person or persons, comprising the steps of providing a remote recording unit including a microphone, attaching the remote recording unit to the child, patient or pet, the remote recording unit being substantially "childproof", such that the remote recording unit cannot normally be removed by the child, patient or pet, the remote recording unit monitoring the background sound bytes at respective times and for given intervals during the time the child, patient or pet is left in the temporary care of the third person or persons and recording those background sound bytes on the remote recording unit, providing a tamper detection means in the remote recording unit and generating an internal "flag" indicating that the remote recording unit was improperly removed by an unauthorized person or persons, removing the remote recording unit from the child, patient or pet, and playing back the recorded sound bytes, thereby determining whether the child, patient or pet was abused, mistreated or subjected to an undesirable environment while in the care of the third person or persons.

30. The method of claim 29, further comprising the steps of providing a docking unit including a speaker, and plugging the remote recording unit into the docking unit for playing back the recorded sound bytes.

31. The method of monitoring the background environment whenever a loved one, such as a child, patient, older person or pet is left in the care of a third person or persons or is placed in an institution or facility, comprising the steps of providing a device which is programmed to sample and record the background environment at various intervals and on a time-compression basis constituting a plurality of bytes, attaching the device to the loved one, so that the device is carried by or worn by the loved one, and playing back the recorded bytes when the loved one is retrieved, thereby determining whether the loved one was abused, mistreated or subjected to an undesirable environment while in the care of the third person or persons or while in the facility or institution, further including the step of providing the device with a tamper-evident means which will indicate, on play back, unauthorized removal of the device or tampering therewith.

32. The method of claim 31 further including the step of attaching the device so that the device is conspicuous and readily apparent, thereby providing an inherent deterrent effect.

33. The method of claim 32, further including the step of providing the device to record sound bytes.

34. The method of monitoring the background environment whenever a loved one, such as a patient, older person or pet, is left in the care of a third person or persons or is placed in an institution or facility, comprising the steps of providing a device which is programmed to sample and record the background environment, attaching the device to the loved one, so that the device is conspicuously carried by or worn by the loved one, playing back the recorded bytes when the loved one is retrieved, thereby determining whether the loved one was abused, mistreated or subjected to an undesirable environment while in the care of the third person or persons or while in the facility or institution, and providing the device with a tamper-evident means which will indicate, on play back, unauthorized removal of the device or tampering therewith.

35. The method of claim 34, further including the step of programming the device to record at various intervals, so that the recording is time-compressed.

* * * * *

UNITED STATES PATENT AND TRADEMARK OFFICE

CERTIFICATE OF CORRECTION

PATENT NO. : 6,072,392
DATED : June 6, 2000
INVENTOR(S) : Henderson et al.

It is certified that error appears in the above-identified patent and that said Letters Patent is hereby corrected as shown below:

On the title page: Item

[73] Assignees: Herbert Jefferson Henderson, Laurel, Md.; assignee of Jose Armando Coronado, Glen Burnie, Md. and Jorge Ivan Negron, Sunrise, Fla..; part interest assigned by Herbert Jefferson Henderson to Leonard Bloom, Towson, Md.

Signed and Sealed this

Twenty-fourth Day of April, 2001

*Attest:*

Nicholas P. Godici

NICHOLAS P. GODICI

*Attesting Officer*

*Acting Director of the United States Patent and Trademark Office*